(12) United States Patent
Harbick et al.

(10) Patent No.: US 8,468,046 B2
(45) Date of Patent: *Jun. 18, 2013

(54) PLAYLIST-BASED DETECTION OF SIMILAR DIGITAL WORKS AND WORK CREATORS

(75) Inventors: Andrew V. Harbick, Shoreline, WA (US); Ryan J. Snodgrass, Kirkland, WA (US); Joel R. Spiegel, Woodinville, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,568

(22) Filed: Aug. 2, 2012

(65) Prior Publication Data
US 2012/0303713 A1  Nov. 29, 2012

Related U.S. Application Data

(63) Continuation of application No. 10/127,358, filed on Apr. 19, 2002, now Pat. No. 8,260,656.

(60) Provisional application No. 60/284,897, filed on Apr. 19, 2001.

(51) Int. Cl.
G06Q 30/00 (2006.01)
G06Q 10/00 (2006.01)

(52) U.S. Cl.
USPC ........ 705/7.31; 705/7.32; 705/7.33; 705/26.7

(58) Field of Classification Search
USPC .............................. 705/7.31, 7.32, 7.33, 26.7
See application file for complete search history.

(56) References Cited

U.S. PATENT DOCUMENTS

| | | | |
|---|---|---|---|
| 5,446,891 | A | 8/1995 | Kaplan et al. |
| 5,615,341 | A | 3/1997 | Agrawal et al. |
| 5,724,567 | A | 3/1998 | Rose et al. |
| 5,734,885 | A | 3/1998 | Agrawal et al. |

(Continued)

FOREIGN PATENT DOCUMENTS

| | | |
|---|---|---|
| WO | 00/17792 | 3/2000 |
| WO | 01/84353 A2 | 8/2001 |

OTHER PUBLICATIONS

Press release entitled "i-drive integrates Kickweb personalization into storage service," dated May 15, 2001, printed from www.anuvio.com/press/pr_010515.html (2 pages).

(Continued)

Primary Examiner — Donald L. Champagne
(74) Attorney, Agent, or Firm — Knobbe, Martens, Olson & Bear, LLP

(57) ABSTRACT

A computer-implemented service recommends digital works (and/or creators of works) to a user based on works currently or previously played or downloaded by the user on a player device or based on playlists stored on the player device. The works may be, for example, music files, video files, electronic books, or other digital content for playing by users. A user may thus obtain personalized recommendations that are based on works obtained from sources (web sites, physical CDs, etc.) that are independent of the recommendations system. In one embodiment, the service identifies pairs of works (and/or work creators) that are similar to each other by virtue of the relatively high frequency with which they co-occur on playlists or within play histories of users. The resulting mappings are used to provide recommendations to users.

24 Claims, 11 Drawing Sheets

U.S. PATENT DOCUMENTS

| | | | |
|---|---|---|---|
| 5,758,333 | A | 5/1998 | Bauer et al. |
| 5,774,868 | A | 6/1998 | Cragun et al. |
| 5,794,209 | A | 8/1998 | Agrawal et al. |
| 5,842,200 | A | 11/1998 | Agrawal et al. |
| 5,872,850 | A | 2/1999 | Klein et al. |
| 5,920,855 | A | 7/1999 | Aggarwal et al. |
| 6,003,029 | A | 12/1999 | Agrawal et al. |
| 6,016,475 | A | 1/2000 | Miller et al. |
| 6,029,139 | A | 2/2000 | Cunningham et al. |
| 6,029,182 | A | 2/2000 | Nehab et al. |
| 6,029,195 | A | 2/2000 | Herz |
| 6,041,311 | A | 3/2000 | Chislenko et al. |
| 6,049,777 | A | 4/2000 | Sheena et al. |
| 6,055,513 | A | 4/2000 | Katz et al. |
| 6,064,980 | A | 5/2000 | Jacobi et al. |
| 6,078,740 | A | 6/2000 | DeTreville |
| 6,084,528 | A | 7/2000 | Beach et al. |
| 6,092,049 | A | 7/2000 | Chislenko et al. |
| 6,108,493 | A | 8/2000 | Miller et al. |
| 6,112,186 | A | 8/2000 | Bergh et al. |
| 6,144,964 | A | 11/2000 | Breese et al. |
| 6,202,058 | B1 | 3/2001 | Rose et al. |
| 6,266,649 | B1 | 7/2001 | Linden et al. |
| 6,330,592 | B1 | 12/2001 | Makuch et al. |
| 6,334,127 | B1 | 12/2001 | Bieganski et al. |
| 6,356,879 | B2 | 3/2002 | Aggarwal et al. |
| 6,438,579 | B1 | 8/2002 | Hosken |
| 6,496,802 | B1 | 12/2002 | van Zoest et al. |
| 6,507,872 | B1 | 1/2003 | Geshwind |
| 6,587,127 | B1 | 7/2003 | Leeke et al. |
| 6,662,231 | B1 | 12/2003 | Drosset et al. |
| 6,691,163 | B1 | 2/2004 | Tufts |
| 6,782,370 | B1 | 8/2004 | Stack |
| 6,912,505 | B2 | 6/2005 | Linden et al. |
| 6,996,572 | B1 | 2/2006 | Chakrabarti et al. |
| 7,031,931 | B1 | 4/2006 | Meyers |
| 7,072,846 | B1 | 7/2006 | Robinson |
| 7,155,401 | B1 | 12/2006 | Cragun et al. |
| 7,797,272 | B2 * | 9/2010 | Picker et al. ............... 707/602 |
| 7,966,334 | B1 | 6/2011 | Bezos et al. |
| 2001/0013009 | A1 | 8/2001 | Greening et al. |
| 2001/0014868 | A1 | 8/2001 | Herz et al. |
| 2002/0082901 | A1 | 6/2002 | Dunning et al. |
| 2005/0071251 | A1 | 3/2005 | Linden et al. |

OTHER PUBLICATIONS

Web page describing Kick.com Music Companion 1.0, printed from http://download.cnet.com (2 pages).

Article entitled "Streamlining the Search for Music," by Brad King, dated May 30, 2000, printed from www.wired.com/news (6 pages).

Selected web pages describing Promedeus, printed from www.promedeus.com, www.winamp.com/plugins/, and http://web.archive.org/web/20010124043900/www.promedeus.com/privacy.html (5 pages).

Press release entitled "MusicMatch Delivers Breakthrough Music Personalization Service in New MusicMatch Jukebox," PR Newswire, dated Feb. 22, 2000 (4 pages).

Press release entitled "MusicMatch Breaks the Sound Quality Barrier with Release of MusicMatch, Jukebox 5.0," PR Newswire, dated Mar. 6, 2000 (3 pages).

Article titled "Personalize me, baby," by Janelle Brown, dated Apr. 6, 2001, printed from http://www.salon.com/tech/feature/2001/04/06/personalization/index.html (3 pages).

Press Release entitled "MediaUnbound takes top spot in UC Berkeley study," dated Nov. 14, 2001, printed from http://www.mediaunbound.com/pr_11-14-2001.jsp (2 pages).

www.whatis.com, "Plugin," archived Dec. 10, 2000 (accessed from www.archive.org).

www.whatis.com, "Database," archived Dec. 8, 2000 (accessed from www.archive.org).

www.promedeus.com, accessed from www.archive.org: "Welcome" (archived Feb. 1, 2001); "Privacy" (archived Jan. 24, 2001).

King, Brad, "Streamlining the Search for Music," www.wired.com/culture/lifestyle/news/2000/05/36629, posted May 30, 2000.

Schafer, et al., "E-Commerce Recommendation Applications,"Data Mining and Knowledge Discovery, vol. 5, Nos. 1-2, Jan. 2001, pp. 115-153.

Define: playlist—Google Search downloaded Dec. 26, 2009.

Program—Definition from the Merriam-Webster Online Dictionary, downloaded Dec. 28, 2009.

Answer and Counterclaims of Amazon.com, Inc., filed Dec. 14, 2006, in matter of *IBM* v. *Amazon.com, Inc.* (case 6:06-cv-452-LED).

Plaintiff and counterclaim-defendant International Business Machines Corporation's Reply, Affirmative defenses and Counterclaims to Amazon.com's Counterclaims, dated Jan. 8, 2007, in matter of *IBM* v. *Amazon.com, Inc.* (case 6:06-cv-452-LED).

Defendant and Counterclaim-Plaintiff Amazon.com, Inc.'s Reply to IBM's Affirmative Defenses and Counterclaims, dated Jan. 29, 2007, in matter of *IBM* v. *Amazon.com, Inc.* (case 6:06-cv-452-LED).

International Business Machines Corporation's Patent Rule 3-3 Invalidity Contentions and Patent Rule 3-4 Document Production dated Apr. 27, 2007 ("IBM's Invalidity Contentions"), in matter of *IBM* v. *Amazon.com, Inc.* (case 6:06-cv-452).

Appendices A1 and A2 of IBM's Invalidity Contentions dated Apr. 27, 2007, in matter of *IBM* v. *Amazon.com, Inc.* (case 6:06-cv-452).

Appendices A3 and A4 of IBM's Invalidity Contentions dated Apr. 27, 2007, in matter of *IBM* v. *Amazon.com, Inc.* (case 6:06-cv-452).

Appendices A5 and A6 of IBM's Invalidity Contentions dated Apr. 27, 2007, in matter of *IBM* v. *Amazon.com, Inc.* (case 6:06-cv-452).

Appendices A7 and A8 of IBM's Invalidity Contentions dated Apr. 27, 2007, in matter of *IBM* v. *Amazon.com, Inc.* (case 6:06-cv-452).

Appendices A9 and A10 of IBM's Invalidity Contentions dated Apr. 27, 2007, in matter of *IBM* v. *Amazon.com, Inc.* (case 6:06-cv-452).

Appendices A11 and A12 of IBM's Invalidity Contentions dated Apr. 27, 2007, in matter of *IBM* v. *Amazon.com, Inc.* (case 6:06-cv-452).

Appendices A13 and A14 of IBM's Invalidity Contentions dated Apr. 27, 2007, in matter of *IBM* v. *Amazon.com, Inc.* (case 6:06-cv-452).

Appendices A15 and A16 of IBM's Invalidity Contentions dated Apr. 27, 2007, in matter of *IBM* v. *Amazon.com, Inc.* (case 6:06-cv-452).

Appendix A17 of IBM's Invalidity Contentions dated Apr. 27, 2007, in matter of *IBM* v. *Amazon.com, Inc.* (case 6:06-cv-452).

Appendix A18 of IBM's Invalidity Contentions dated Apr. 27, 2007, in matter of *IBM* v. *Amazon.com, Inc.* (case 6:06-cv-452).

Appendix A19 of IBM's Invalidity Contentions dated Apr. 27, 2007, in matter of *IBM* v. *Amazon.com, Inc.* (case 6:06-cv-452).

Appendix A20 of IBM's Invalidity Contentions dated Apr. 27, 2007, in matter of *IBM* v. *Amazon.com, Inc.* (case 6:06-cv-452).

Appendix A21 of IBM's Invalidity Contentions dated Apr. 27, 2007, in matter of *IBM* v. *Amazon.com, Inc.* (case 6:06-cv-452).

Appendix A22 of IBM's Invalidity Contentions dated Apr. 27, 2007, in matter of *IBM* v. *Amazon.com, Inc.* (case 6:06-cv-452).

Appendix A23 of IBM's Invalidity Contentions dated Apr. 27, 2007, in matter of *IBM* v. *Amazon.com, Inc.* (case 6:06-cv-452).

Appendix A24 of IBM's Invalidity Contentions dated Apr. 27, 2007, in matter of *IBM* v. *Amazon.com, Inc.* (case 6:06-cv-452).

Appendix A25 of IBM's Invalidity Contentions dated Apr. 27, 2007, in matter of *IBM* v. *Amazon.com, Inc.* (case 6:06-cv-452).

Appendix B of IBM's Invalidity Contentions dated Apr. 27, 2007, in matter of *IBM* v. *Amazon.com, Inc.* (case 6:06-cv-452).

Agrawal, R., et al., "Mining Association Rules between Sets of Items in Large Databases," Proceedings of the 1993 ACM, SIGMOD International Conference on Management of Data, pp. 207-216, Washington D.C. (May 1993).

Agrawal, R., et al., "Fast Algorithms for Mining Association Rules," Proceedings 20th International Conference on Very Large Databases, {VLDB}, pp. 487-499, Santiago, Chile, (Sep. 1994).

Agrawal, R., et al., "Fast Algorithms for Mining Association Rules," IBM Research Report RJ9839, 31 pages, dated Nov. 16, 1994.

Agrawal, R., et al., "Active Data Mining," IBM Almaden Research Center, Proceedings of the 1st International Conference on Knowledge Discovery in Databases and Data Mining, KDD-95, (1995).

Agrawal, R., et al., "Mining Sequential Patterns," IBM Almaden Research Center, Proceedings of the 11th International Conference on Data Engineering, Taipei, Taiwan, (Mar. 1995).

Srikant, R., et al., "Mining Generalized Association Rules," IBM Almaden Research Center, Proceedings of the 21st International Conference on Very Large Databases, Zurich, Switzerland, (Sep. 1995).

Srikant, R., et al., "Mining Sequential Patterns: Generalizations and Performance Improvements," Proceedings of the Fifth International Conference on Extending Database Technology (EDBT), Avignon, France, (1996).

Agrawal, R., et al., "Parallel Mining of Association Rules," IEEE Transactions on Knowledge and Data Engineering, vol. 8, No. 6, (Dec. 1996).

Agrawal, R., et al., "Developing Tightly-Coupled Data Mining Applications on a Relational Database System," IBM Almaden Research Center, Proceedings of the Second International Conference on Knowledge Discovery and Data Mining, KDD-96 Proceedings, (1996).

Agrawal, R., et al., "Parallel Mining of Association Rules: Design, implementation, and experience," IBM Research Division, Almaden Research Center, IBM Research Report RJ10004, Computer Science/Mathematics, dated Feb. 1, 1996.

Srikant, R., et al., "Mining Quantitative Association Rules in Large Relational Tables," IBM Almaden Research Center, Proceedings of the ACM SIGMOD Conference on Management of Data, Montreal, Canada, (Jun. 1996).

Agrawal, R., et al., "The Quest Data Mining System," Proceedings 1996 International Conference Data Mining and Knowledge Discovery (KDD'96), pp. 244-249, Portland, Oregon, (Aug. 1996).

Salton, G., et al., "Computer Evaluation of Indexing and Text Processing," The SMART Retrieval System: Experiments in Automatic Document Processing, Prentice-Hall, (1971).

Decision issued by EPO on Dec. 13, 2010, in European Appl. No. 99 951 441.7.

Yezdezard Zerxes Lashkari, "Feature Guided Automated Collaborative Filtering," B. Tech, Computer Science and Engineering, Indian Institute of Technology, Bombay (May 1991).

"IBM announces data mining solution for improved decision making; new ammo for knowledge discovery and validation of business intelligence," Business Wire, pp. 1-4, dated Apr. 9, 1996.

Gifford, David K., et al., "Payment Switches for Open Networks," Proceedings of the First USENIX Workshop on Electronic Commerce, New York, New York, pp. 1-8 (Jul. 1995).

Karlgren, Jussi, "Newsgroup Clustering Based on User Behavior—A Recommendation Algebra," SICS Technical Report, T94:04, ISSN 1100-3154 (Mar. 1994).

Mobasher, Bamshad, et al., "Automatic Personalization Based on Web Usage Mining," printed from http://maya.cs.depaul.edu/~mobasher/personalization/index.html (1 de 24) [Oct. 27, 2003 18:24:00], pp. 1-24.

Mobasher, Bamshad, et al., "Web Mining: Pattern Discovery from World Wide Web Transactions," Department of Computer Science and Engineering, University of Minnesota, pp. 1-12, dated Mar. 8, 1997.

Wu, K. L., et al., "SpeedTracer: A Web usage mining and analysis tool," IBM Systems, Journal, vol. 37, No. 1, pp. 1-17, (1998).

Shardanand, Upendra, "Social Information Filtering for Music Recommendations," Submitted to the Department of Electrical Engineering and Computer Science on Sep. 1, 1994, in partial fulfillment of the requirements for the degrees of Bachelor of Science in Electrical Science and Engineering and Master of Engineering in Electrical Engineering and Computer Science, Massachusetts Institute of Technology, stamped Nov. 18, 1994 (Libraries Archives).

"Feedforward neutral network," Wikipedia, downloaded Jan. 28, 2011.

Apte, C., "Data Mining—An Industrial Research Perspective," IEEE Computational Science and Engineering, Apr.-Jun. 1997; found online with the Google search made of record herewith and downloaded Jan. 28, 2011.

Order Construing Claims issued on Jan. 11, 2011, in case No. 2:09-cv-00681-RSL (13 pages).

Complaint for Patent Infringement, dated May 15, 2009, in matter of *Amazon.com, Inc.* v. *Discovery Communications, Inc.* (case No. C09-0681 RSL).

Defendant Discovery Communications, Inc.'s Answer to the Complaint, dated Jul. 23, 2009, in matter of *Amazon.com, Inc.* v. *Discovery Communications, Inc.* (case No. 2:09-cv-0681-RSL).

Defendant Discovery Communications, Inc.'s Local Patent Rule 121 Invalidity Contentions, dated Nov. 16, 2009, in matter of *Amazon.com, Inc.* v. *Discovery Communications, Inc.* (case No. 2:09-cv-0681-RSL).

Defendant Discovery Communications, Inc.'s First Amended Answer, Defenses, & Counterclaims, dated Jan. 25, 2010, in matter of *Amazon.com, Inc.* v. *Discovery Communications, Inc.* (case No. 2:09-cv-0681-RSL).

Plaintiff Amazon.com, Inc.'s Reply to Defendant Discovery Communications, Inc.'s First Amended Answer, Defenses and Counterclaims, dated Feb. 23, 2010, in matter of *Amazon.com, Inc.* v. *Discovery Communications, Inc.* (case No. 2:09-cv-0681-RSL).

Joint Claim Construction and Prehearing Statement, dated Oct. 25, 2010, in matter of *Amazon.com, Inc.* v. *Discovery Communications, Inc.* (case No. 2:09-cv-0681-RSL).

Joint Claim Chart (Exhibit A) dated Oct. 25, 2010, in matter of *Amazon.com, Inc.* v. *Discovery Communications, Inc.* (case No. 2:09-cv-0681-RSL).

Plaintiff Amazon.com, Inc.'s Opening Claim Construction Brief Covering U.S. Patent Nos. 6,006,225; 6,169,986; 6,266,649 and 6,317,722, dated Nov. 11, 2010, in matter of *Amazon.com, Inc.* v. *Discovery Communications, Inc.* (case No. 2:09-cv-0681-RSL).

Defendant Discovery Communications, Inc.'s Opening Claim Construction Brief, dated Nov. 11, 2010, in matter of *Amazon.com, Inc.* v. *Discovery Communications, Inc.* (case No. 2:09-cv-0681-RSL).

Plaintiff Amazon.com, Inc.'s Responsive Claim Construction Brief Covering U.S. Patent Nos. 6,006,225; 6,169,986; 6,266,649 and 6,317,722, dated Dec. 2, 2010, in matter of *Amazon.com, Inc.* v. *Discovery Communications, Inc.* (case No. 2:09-cv-0681-RSL).

Discovery Communications, Inc.'s Responsive Claim Construction Brief, dated Dec. 2, 2010, in matter of *Amazon.com, Inc.* v. *Discovery Communications, Inc.* (case No. 2:09-cv-0681-RSL).

Exhibit D-1: Invalidity Chart for the Linden '649 Patent Based on Gustos Publication and Product ("Gustos"), dated Nov. 16, 2009, in matter of *Amazon.com, Inc.* v. *Discovery Communications, Inc.* (case No. 2:09-cv-0681-RSL).

Exhibit D-2: Invalidity Chart for the Linden '649 Patent Based on Amazon.com Website ("Amazon.com"), dated Nov. 16, 2009, in matter of *Amazon.com, Inc.* v. *Discovery Communications, Inc.* (case No. 2:09-cv-0681-RSL).

Exhibit D-3: Invalidity Chart for the Linden '649 Patent Based on U.S. Patent No. 6,782,370 to Stack ("Amazon.com"), dated Nov. 16, 2009, in matter of *Amazon.com, Inc.* v. *Discovery Communications, Inc.* (case No. 2:09-cv-0681-RSL).

Exhibit D-4: Invalidity Chart for the Linden '649 Patent Based on U.S. Patent No. 6,334,127 to Bieganski (Filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL).

Exhibit D-5: Invalidity Chart for the Linden '649 Patent Based on U.S. Patent No. 5,749,081 to Whiteis (Filed Apr. 6, 1995, and Issued May 5, 1998) ("Whiteis '081"), in matter of *Amazon.com, Inc.* v. *Discovery Communications, Inc.* (case No. 2:09-cv-0681-RSL).

Exhibit D-6: Invalidity Chart for the Linden '649 Patent Based on U.S. Patent No. 5,583,763 to Atcheson (Filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL).

Exhibit E-1: Invalidity Chart for Jacobi '722 Patent Based on Gustos Publication and Product ("Gustos"), dated Nov. 16, 2009, in matter of *Amazon.com, Inc.* v. *Discovery Communications, Inc.* (case No. 2:09-cv-0681-RSL).

Exhibit E-2: Invalidity Chart for Jacobi '722 Patent Based on Amazon.com Website, dated Nov. 16, 2009, in matter of *Amazon.com, Inc.* v. *Discovery Communications, Inc.* (case No. 2:09-cv-0681-RSL).

Exhibit E-3: Invalidity Chart for Jacobi '722 Patent Based on U.S. Patent No. 6,782,370 to Stack (Filed Sep. 4, 1997, and Issued Aug. 24, 2004) ("Stack '370"), in matter of *Amazon.com, Inc.* v. *Discovery Communications, Inc.* (case No. 2:09-cv-0681-RSL).

Exhibit E-4: Invalidity Chart for Jacobi '722 Patent Based on U.S. Patent No. 6,334,127 to Bieganski (Filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL).

Exhibit E-5: Invalidity Chart for Jacobi '722 Patent Based on U.S. Patent No. 5,749,081 to Whiteis (Filed Apr. 6, 1995, and Issued May 5, 1998) ("Whiteis '081"), in matter of *Amazon.com, Inc.* v. *Discovery Communications, Inc.* (case No. 2:09-cv-0681-RSL).

Exhibit E-6: Invalidity Chart for Jacobi '722 Patent Based on U.S. Patent No. 5,583,763 to Atcheson (Filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL).

Exhibit F-1: titled "Other Prior Art that Discloses or Renders Obvious Limitations of Amazon's '649 and '722 Patents," dated Nov. 16, 2009, in matter of *Amazon.com, Inc.* v. *Discovery Communications, Inc.* (case No. 2:09-cv-0681-RSL).

Joshua Alspector et al., "Feature-based and Clique-based User Models for Movie Selection: A Comparative Study," in User Modeling and User-Adapted Interaction 7, pp. 279-304, dated 1997.

"Internet Shopping Threatens Retailers," Reuters, DowJones, p. 1 of 2 (2009) Factiva, Inc.

Al Borchers, et al., "Ganging up on Information Overload," University of Minnesota, Internet Watch, pp. 106-108, (Apr. 1998).

Tim Dorgan, "Belief in the Future," Progressive Grocer; Feb. 1997; vol. 76, No. 2; ABI/INFORM Global, pp. 67-68.

Greg Elofson, et al., "Creating a Custom Mass-Production Channel on the Internet," Communications of the ACM, Mar. 1998, vol. 41, No. 3, pp. 57-62.

Greg Enright, "Collaborative Filtering Weeds out Irrelevant Data," in Information World Canada, Sep. 1997, vol. 22, No. 9; ABI/INFORM Global, p. 11.

"Firefly Technology: Tools for Cultivating Profitable Customer Relationships," printed from http://web.archive.org/web/19970116111618/www.firefly.net/technology.htm (Jan. 16, 1997).

D. Fisk, "An Application of Social Filtering to Movie Recommendation," Software Agents and Soft Computing Towards Enhancing Machine Intelligence, Data Mining Group, BT Laboratories, Lecture Notes in Computer Science, ISSN: 0302-9743 (print), vol. 1198/1997, pp. 116-131, printed on Oct. 29, 2009, from springerlink.com/.../ek4665q6h51072w.

Natalie Glance, et al., "Knowledge Pump: Community-centered Collaborative Filtering," Xerox Research Centre Europe, Grenoble Laboratory, pp. 1-5, Oct. 27, 1997.

Gustos, "Why You Should Use Gustos?" printed from http://web.archive.org/web/19980131020417/www.gustos.com/applications.html (Jan. 31, 1998).

Justin Hibbard, "Just Add People," Information Week, vol. 662, ABI/INFORM Global, p. 65, Dec. 22, 1997.

Paul N. Hodgdon, "The Role of Intelligent Agent Software in the Future of Direct Response," Direct Response, Direct Marketing, pp. 10-17, Jan. 1997.

Marguerite Holloway, "Wired," printed from http://wired.com/wired/archive/5.12/maes_pr.html, pp. 1-7, dated Nov. 4, 2009.

Thorsten Joachims, et al., "WebWatcher: A Tour Guide for the World Wide Web," in 6 pages (undated).

Bruce Krulwich, "Lifestyle Finder, Intelligent User Profiling Using Large-Scale Demographic Data," AI Magazine, American Association for Artificial Intelligence, pp. 37-45, Summer 1997.

Len Lewis, "Short Circuits," One-click shopping, Progressive Grocer, vol. 76, No. 7, ABI/INFORMAL Global, p. 80, Jul. 1997.

Paul McJones, et al., "SRC Technical Note," Each to Each Programmer's Reference Manual, Digital Equipment Corporation, p. 1-16, dated Oct. 1, 1997.

David M. Nichols, et al., "Recommendation and Usage in the Digital Library," Lancaster University Computing Department, Cooperative Systems Engineering Group, pp. 1-15, (1997).

Catherine Applefeld Olson, "Merchants & Marketing," Software Aims to Personalize Net Retailing, Billboard, Research Library, vol. 110, No. 13, 2 pages, dated Mar. 28, 1998.

Rose, Daniel E., et al., "MessageWorld: A New Approach to Facilitating Asynchronous Group Communication," CIKM '95, ACM 0-89791-812-6, pp. 266-273, (1995).

Curt Stevens, "Automating the Creation of Information Filters," Communications of the ACM, vol. 35, No. 12, Dec. 1992.

Loren G. Terveen, et al., "Building Task-Specific Interfaces to High Volume Conversational Data," Papers, CHI 97, Atlanta, GA, ACM 0-89791-802-9/97/03, pp. 226-233, Mar. 22-27, 1997.

"Tvisions Delivers Harvard Business School Publishing Onto World Wide Web," PR Newswire, dated Jul. 16, 1996.

"The WEBDOGGIE Personalized Document Filtering System," 3 pages printed from http://web.archive.org/web/19961213005420/http://webhound.www.media.mit.edu/projects/webhound/doc/webhound.html (Dec. 13, 1996).

Stephen H. Wildstrom, "Service with a Click," Business Week, Technology & You, No. 3519, p. 19, dated Mar. 24, 1997.

* cited by examiner

US 8,468,046 B2

PLAYLIST-BASED DETECTION OF SIMILAR DIGITAL WORKS AND WORK CREATORS

RELATED APPLICATIONS

This application is a continuation of U.S. application Ser. No. 10/127,358, filed Apr. 19, 2002, now U.S. Pat. No. 8,260, 656 which claims the benefit of U.S. Provisional Patent Appl. No. 60/284,897, filed on Apr. 19, 2001 and entitled RECOMMENDATIONS AND SERVICES BASED ON WORKS PLAYED OR STORED ON USER DEVICES, which is incorporated herein by reference. The present application is also related generally to U.S. application Ser. No. 09/821, 712, filed on Mar. 29, 2001 and entitled USE OF PRODUCT VIEWING HISTORIES OF USERS TO IDENTIFY RELATED PRODUCTS (now U.S. Pat. No. 6,912,505), which is hereby incorporated by reference.

FIELD OF THE INVENTION

The present invention relates to digital works, such as music files, video files, and electronic books, and relates to user devices for playing or consuming such works. More specifically, the invention relates to methods for remotely monitoring the digital works consumed by users on their devices and for using such information to provide personalized recommendations or other targeted content to users.

BACKGROUND OF THE INVENTION

Various types of devices exist for allowing users to play or otherwise consume digital works. The devices can include both (a) dedicated devices such as portable MP3 players, Compact Disk (CD) players, Digital Video Disk (DVD) players, and handheld electronic book devices; and (b) general-purpose computing devices such as PCs and Personal Digital Assistants (PDAs) configured to play or output digital works to users. Both classes of devices are referred to herein generally as "player devices" or "players," and the act of listening to, viewing, or otherwise consuming a work on such a device is referred to herein as "playing" the work.

One limitation with existing player devices is that they generally do not provide or support an intelligent mechanism for identifying, based on the works the user has played or stored on a user device, other works that may be of interest to the user. Although some web sites provide services for recommending music, video, and book titles to users, these recommendations generally do not reflect the works actually played or downloaded by the user, and typically do not take in to consideration what a user is currently playing. Further, many recommendation services are incapable of making accurate recommendations until the user has explicitly created a preferences profile, or has purchased a sufficient number of products to permit an accurate profile to be created. Thus, if a user fails to create a detailed profile, or if the user purchases or downloads works from many different sources, the recommendations may be unreliable.

SUMMARY

A system is disclosed that uses user-generated playlists to detect relationships between digital works and/or their creators. In one embodiment, the system receives user-generated playlists from each of a plurality of player devices of each of a plurality of users. Each such playlist identifies a set of digital works grouped together for playing. The system detects relationships between particular digital works or creators at least partly by determining how frequently particular digital works or creators co-occur on the playlists. Additional sources of relationship data, such as the play histories associated with users, may also be used for this purpose. The detected relationship data may be used to provide personalized recommendations to users.

An important benefit provided to a user of the system, in one embodiment, is that the recommendations are based on the works played by the user from sources that are independent of the recommendations system. Thus, for example, even though the user may play works downloaded from many different web sites and/or may play CDs purchased from a store, all of these works may be taken into consideration in selecting additional works to recommend to that user.

DETAILED DESCRIPTION OF THE PREFERRED EMBODIMENTS

Throughout the following description, the term "work" refers generally to a collection of content that is adapted to be played or consumed as a unit. Examples of works include albums and CD titles, individual tracks of album/CD titles, movie and video titles, book titles, television shows, commercials, and other audio and/or visual content. The term "digital work" refers to a digital representation or version of a work, such as an MP3 file, a WAV file, a video file, an electronic book file, or a compilation of such files. A digital work can also be in the form of a real-time stream of digital content that may or may not be buffered, cached, or otherwise stored. The term "creator" refers generally to a person or entity that creates a work, such as an author, a musical artist, or a writer of movies.

I. Overview

The present invention includes computer processes in which player devices of users transmit user-generated playlists, and/or information regarding digital works played or stored on such devices, to a server. The server preferably uses this information to recommend other works or related items to the users. The aggregated playlists or play histories of a population or community of users may also be analyzed collectively to identify works or work creators that are currently the most popular and/or to identify works or creators that are similar.

Figure 1:
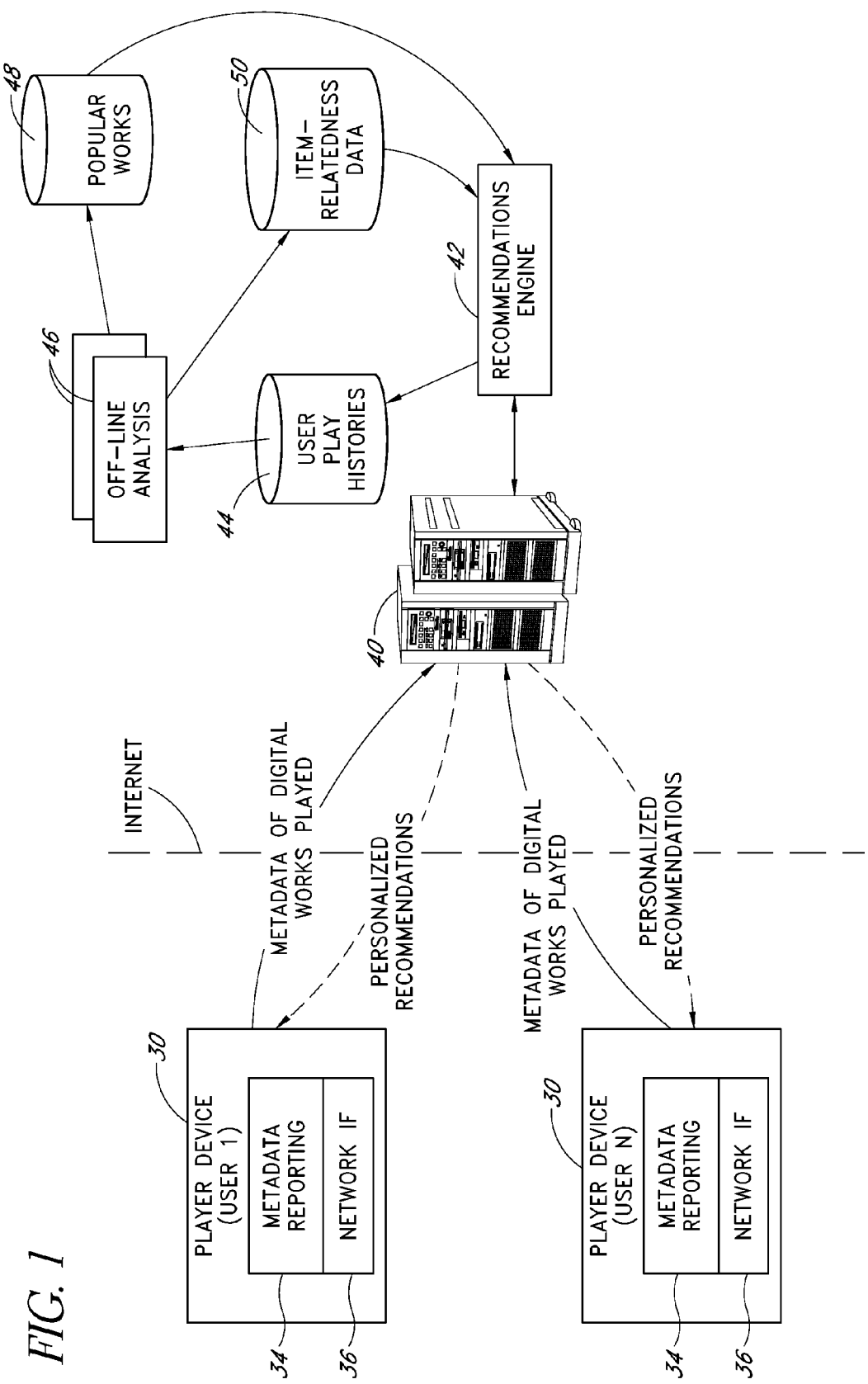
FIG. 1 illustrates a system according to one embodiment of the present invention.

FIG. 1 illustrates the components of a system according to one embodiment of the invention. The system includes one or more types of player devices 30 that communicate over a computer network, such as the Internet, with a remote server system 40 ("server"). The player devices 30 may be dedicated players, general-purpose computing devices configured to operate as players, or a combination thereof. The player devices and server may optionally belong to a distributed audio system that comprises a storage module for digital works. A player may also be embodied as a set-top box that operates in conjunction with a computer monitor or television screen. All of the players within a given system may be associated with a particular type of digital work, such as music, video, or electronic books. The server 40 may, but need not, be provided in conjunction with a web site of a merchant or other entity that sells or distributes works.

As depicted in FIG. 1, each player device 30 includes a metadata reporting component 34 coupled to a network interface 36. Metadata regarding a digital work can include such information as a work's title, author, artist performing the work, duration, year of publication, and collection (e.g., album or CD) in which the work was published. The metadata may be any type of information that identifies, or may be used to identify, a work or its creator. For example, in music embodiments, the metadata may include the DiscID of a CD being played, or the Album/Artist/Track information commonly encoded in MP3 files. In one embodiment, the filename of a file storing a work can be used as identifying metadata. When metadata is not encoded within a file that stores a work, associated identifying data may be found encoded in a user-generated playlist or other associated file and may be used by the metadata reporting component 34.

The metadata reporting component 34 operates generally by detecting when a user plays a digital work, extracting or generating metadata associated with the digital work, and reporting the metadata to the server system 40. The metadata reporting component 34 may also report information about digital works that have merely been loaded onto or into the player device 30.

The metadata reporting component 34 is typically implemented in software, but may alternatively be implemented partially or wholly in dedicated hardware. The network interface 36 may be a network card, a wired or wireless modem, a Bluetooth or 802.11 transceiver, or any other type of device that provides data connectivity to a computer network. When a network connection does not currently exist, or if desired for other reasons, the metadata reporting component 34 may cache (temporarily store) the metadata for the played works until a connection is established or until the metadata is requested in order to generate related recommendations.

The server 40 executes or communicates with a recommendations engine 42 that uses the reported metadata to provide personalized recommendations of works, work creators, and/or related items. The personalized recommendations may be based solely on the work to which the user is currently listening (or is otherwise consuming). Recommendations may also be based on a list or history of works played by the user, and may include information gleaned from the play histories of all users or all users in a particular community, as will be described in greater detail in Sections III and IV below.

As depicted in FIG. 1, the server 40 may optionally maintain a database 44 of user-specific play histories. Each play history is preferably associated with a particular user account or profile, although the user-specific play histories may alternatively be maintained anonymously. Each play history may, for example, be in the form of a list of IDs of the works played by a particular user, together with time/date stamps indicating when each such work was selected or played. Where play histories are stored in association with specific user accounts, they are preferably used by the recommendations engine 42 to provide personalized recommendations to users.

As further depicted in FIG. 1, the user-specific play histories 44 may be collectively analyzed on a periodic basis by one or more off-line analysis components 46 to generate various types of information. For example, in one embodiment, the play histories 44 of all users, or all users in a particular community (e.g., those in a particular geographic area or demographic grouping, or those having email addresses that share a common domain name) are analyzed periodically (e.g., once per day) to identify the works and/or creators that are currently the most "popular." Examples of processing methods and algorithms that may be used for this purpose are disclosed in U.S. application Ser. No. 09/377,447, filed Aug. 19, 1999 (published as WO 00/62223), the disclosure of which is hereby incorporated by reference.

The information about the works and/or creators that are currently the most popular may be stored in a popular works repository 48 and may be presented to users by the recommendations engine 42 as a personalized or non-personalized service for assisting users in selecting items from a catalog. For example, users of a merchant web site that sells works in one or more media formats may be informed of the works that are currently the most popular in various categories and/or communities. Information from the popular works repository may also be used in conjunction with the generation of personalized recommendations. For example, a merchant may chose to filter the list of recommended works to give preference to (or to eliminate) recommended works which also appear in the popular works repository 48. The information may also be used by merchants and/or manufacturers to manage inventory, manufacturing, and advertising. For example, if play histories show that a particular CD is rapidly gaining in popularity, manufacturers and retailers can increase production and inventory, respectively. Similarly, if the system is used to monitor the viewing habits of users presented with digital advertising videos, marketers can use the information generated by the system to evaluate audience reaction to the videos and to make effective advertising campaign decisions.

As depicted in FIG. 1, the play histories 44 may also be collectively processed by the off-line analysis components 46 periodically to identify works or creators that are similar to one another. This analysis may be accomplished, for example, by determining and comparing the frequencies with which specific works (or creators) co-occur within the play histories of users. For example, works (or creators) A and B may be treated as highly similar if a significant portion of those who played A also played B, as reflected in the play histories 44. In one embodiment, this analysis is performed using session-specific user play histories (e.g., works or creators A and B are similar because a significant portion of those who played A also played B during the same playing session). Section IV below describes examples of processing methods that may be used to determine work or creator relatedness levels from the play histories 44.

The resulting item relatedness data may be stored in an item relatedness repository 50, such as a database, and may be used by the recommendations engine 42 to identify works or creators that are similar to those played by the user. For example, when a user plays work A, the server 40 may automatically recommend the N works that have most frequently been played by users who played A. In one embodiment, once the user has played works A, B, and C, the recommendations engine 42 may then use the item relatedness data to select and recommend works that are the most similar to the group of A, B, and C. When recommendations are provided based on the creators of works, the recommendations engine 42 may access "creator-relatedness data" that is generated and used in a manner similar to the item relatedness data as described in greater detail in Section IV below. Once related creators are identified, the recommendations engine 42 can recommend works by the related creators. Examples of processing methods that may be used for generating recommendations are described in Section III below.

As depicted in FIG. 1, the personalized recommendations may be displayed on the corresponding player device 30 itself as the associated works are being played. For example, in embodiments in which the player 30 is a general purpose computing device (as in the example implementation described below), the recommendations may be presented on web pages that are effectively pushed to the computing device 30 for display. Users may also have the option to download their recommendations for off-line viewing.

The personal recommendations may also or alternatively be communicated to the user via a separate user device. For instance, when a user visits a web page associated with the server 40, the page may be customized with personalized recommendations based on works recently played on the user's home stereo system 30.

II. Example Implementation

An example implementation of the FIG. 1 system will now be described with reference to FIG. 2. In this embodiment, the player devices 30 are Personal Computers or other general purpose computing devices (one shown), which are configured to play music and to access the web site system 58 of an online merchant that sells music works. The description of this implementation is intended to illustrate, and not to limit, the scope of the invention.

Figure 2:
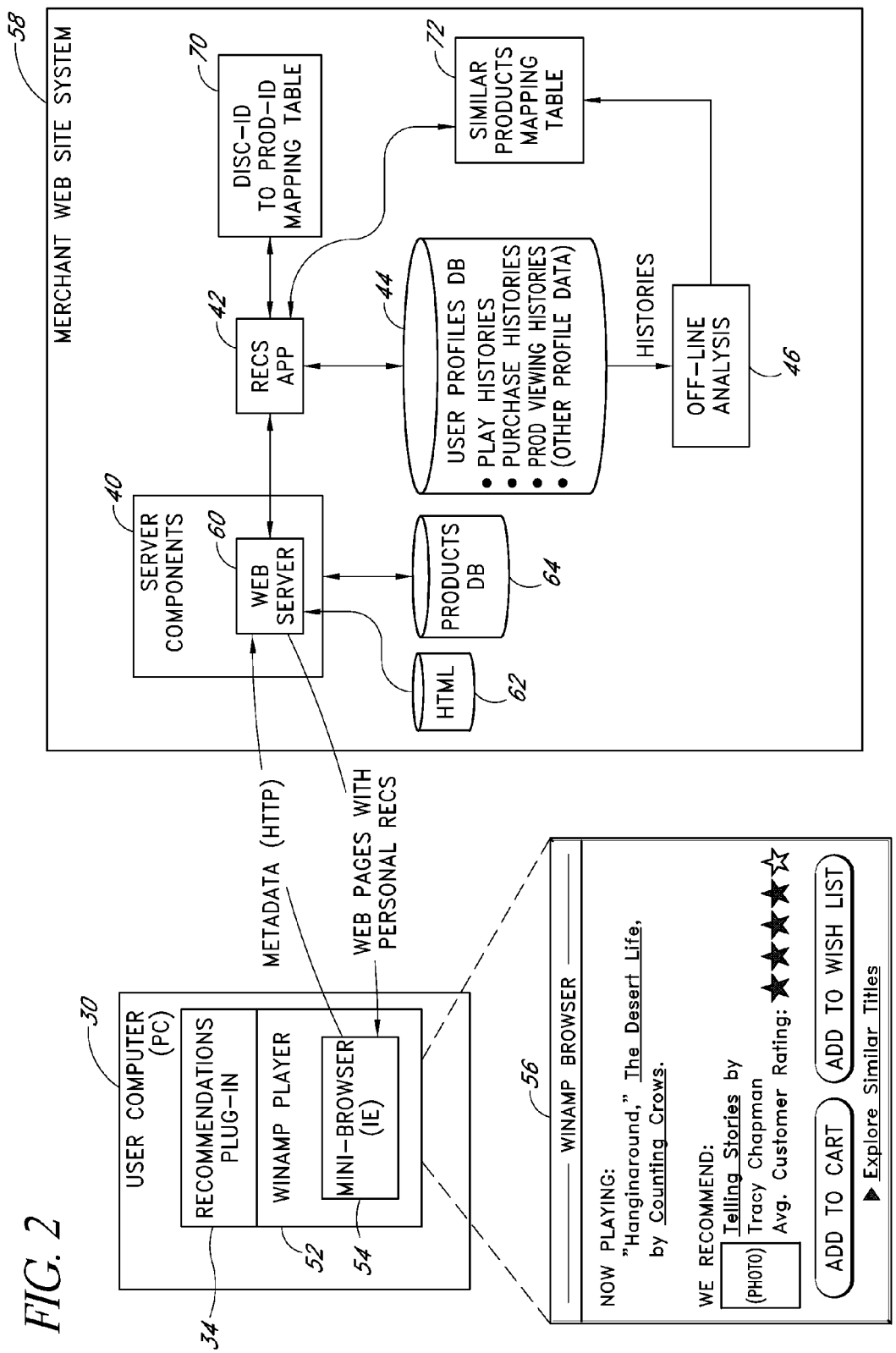
FIG. 2 presents an example implementation of the system depicted in FIG. 1.

As illustrated in FIG. 2, the user PC 30 runs a Winamp™ player 52, which is commercially available as a free download. The Winamp player 52 supports various music file formats, including MP3/MP2, WAV/VOC, and CDA (Compact Disk Audio). The player 52 includes a built-in mini browser 54, which is a Microsoft™ Internet Explorer (IE) component. The mini-browser 54 provides a small browser window 56 that is displayed in conjunction with the player's user interface (not shown).

The PC 30 also runs a recommendations plug-in 34, which is a Winamp plug-in in the illustrated embodiment. This plug-in 34 may, for example, be provided as a free download to customers of the merchant web site 58. The functionality of all or part of the recommendations plug-in 34 could alternatively be incorporated into the native code of the player 52 itself. As described below, the recommendations plug-in 34 includes functionality for extracting and for reporting to the merchant web site system 58, information about music files played on the user device 30.

Some currently available music file formats, such as the MP3 format, include provisions for storing metadata about the works in data fields (e.g., ID3 tags) that are stored in the files along with the works themselves. One example of such metadata for musical works is a DiscID number associated with each commercially published CD and found in the CD's table of contents. ID3 tags that comprise Album/Artist/Track information about a work are another example of metadata.

The merchant web site system 58 includes various server components 40, including a web server 60 that accesses a database of HTML (Hypertext Markup Language) content 62. The various music titles and other products that are available for purchase in various media formats at the merchant web site 58 are described in a products database 64. The products database 64 can include, for example, an online catalog of music titles and product detail pages for items available for purchase at the merchant web site 58. Product detail pages associated with specific music works provide information about the works and may be located using a search engine, a browse tree, and various other navigation tools.

Typically, a product ID number or other identifier is associated with each product in the catalog. Recommendations are typically provided according to product IDs, which may or may not correspond directly to works played or downloaded on the player device 30. For example, the player device 30 may be configured to recognize and to report metadata of individual songs or television shows played, while the products database 64 of the merchant web site 58 may identify product IDs for entire CDs or albums or series of television shows. Depending on the needs of the merchant or other provider of recommendations, product ID's may be associated with individual works, such as, for example, individual songs, and, alternatively or additionally, may be associated with collections of individual works, such as, for example, CDs of songs. Part of the system for generating personalized recommendations based on metadata extracted from works consumed on player devices involves effectively identifying a product ID from the products database 64 that best corresponds to the work, so that other related works can be identified and sent to the user as recommendations.

The web server 60 communicates with a recommendations application 42 that selects products (music titles) to recommend to users based on the music titles played by such users, or based on other "items of known interest," as described in greater detail in Section III below. The recommendations may be of music titles available for purchase at the web site 58, without regard to the particular media format or formats available (i.e., all versions of a particular music title may be treated as the same "product").

In the embodiment shown in FIG. 2, the recommendations application 42 is also responsible for maintaining the user play histories 44 based on metadata reported by the recommendations plug-in 34. The recommendations application 42 accesses a pre-generated table 70 that maps DiscIDs of music titles to corresponding product IDs in the products database 64 and stores the user play histories in a user profiles database 44.

As illustrated in FIG. 2, in addition to user play histories, the user profiles database 44 can store other information about known users of the site. For example, the user profiles may include user purchase histories, download histories, viewing histories, and user-provided ratings of works, as well as other types of information.

The recommendations application 42 also accesses a similar products mapping table 72 that maps specific products in the online catalog to other similar or related products in the catalog. Each entry in this table contains (1) a product ID for a first product, and (2) a list of the product IDs for the products deemed to be the most similar to the first product. The table may also include score values or indices indicating the degrees of similarity between specific items, and the similar items may be listed in order, ranked according to their similarity scores. The similarities reflected in this table 72 may be based on a periodic, automated analysis of user-specific play histories, download lists, product purchase histories, and/or an alternative source of product relatedness data. The generation of "similar products mappings" is described in greater detail in Section IV below.

In one embodiment, the recommendations plug-in 34 in the user PC 30 operates generally by continuously "listening" to determine whether the currently playing track has changed. When a new track is detected, the plug-in 34 attempts to send identifying information about the currently playing digital work to the merchant web site system 58.

In one embodiment, the plug-in 34 first attempts to identify a DiscID associated with the digital work. If a CD or a copy of a CD is playing, the DiscID may often be generated from the CD's table of contents or other embedded metadata. If an MP3 file is playing, the plug-in 34 may attempt to extract the Album/Artist/Track information from either ID3 tags encoded in the file, or, if the file does not have readable ID3 tags, from the item titles in the playlist, if one exists. Extraction of metadata associated with digital works may be implemented using known algorithms—such as those published by CDDB and FreeDB.org.

In one embodiment, once the plug-in 34 has generated some form of identifying metadata for a currently playing work, the plug-in 34 encodes the resulting DiscID and/or Album/Artist/Track information or other metadata into a URL (Uniform Resource Locator) associated with the recommendations application 42, and passes this URL to the mini-browser 54. The receipt of the URL causes the mini-browser 54 to generate an HTTP GET request for the given URL. If the user is currently signed-in via the regular IE browser 54 on the PC 30 and has a session cookie, the session cookie can be automatically passed by the plug-in 34 with the GET request.

The following is an example of a URL that may be passed to the server in response to the playing of an MP3 file, entitled "Hanginaround," for which no DiscID could be identified, nor metadata extracted from the ID3 tags:

http://www.merchant.com/musicrecs/sessionID=1234?artist=
Counting%20Crows%20&title=%20This%20Desert%20Life&track=
Hanginaround&confident=false In this example, the string "confident=false" at the end of the URL is passed to the server side to indicate that the Album/Artist/Track information could not be extracted from the ID3 tags, and was instead parsed from the playlist (and is therefore considered to be less reliable).

In other embodiments, identifying information about the currently playing digital work can be transmitted to the recommendations application using methods, transports, and protocols other than the URL method described above, as will be familiar to one skilled in the art.

In response to the HTTP GET request described above, the web server 60 passes on a request to the recommendations application 42 to generate a list of associated recommended works. If necessary, the recommendations application 42 may access the user profiles database 44, the similar products mapping table 72, and the DiscID-to-ProductID mapping table 70, as will be described in greater detail in Sections III and IV below. Once the recommendations are generated, the web server 60 returns a web page, such as the example page shown displayed in the small browser window 56 in FIG. 2. The example page identifies the currently playing work that has been detected and includes a recommendation of a CD entitled Telling Stories by Tracy Chapman and a link. Selecting a link from the small mini-browser window 56 causes a new page to be loaded, displaying further information about the currently playing work and/or the recommended work. From the small mini-browser window 56, the user can also choose to add the recommended title to a personal shopping cart or to a wish list, or to view similar recommended titles.

Once a list of related products has been generated by the recommendations application 42 for the currently playing track, this list may be cached and used to update the page displayed in the mini-browser 56 while the track is playing. For example, the page may be updated periodically (e.g. every 10 seconds) to sequence through a list of recommended products.

The plug-in 34 may also be configured to cache the metadata associated with played tracks when no network connection currently exists. The cached metadata may subsequently be transferred to the web site system 58 when a network connection is established, or when the user synchronizes the device with a computer having a network connection.

In addition to generating real-time recommendations based on the currently playing track, the web site system 58 may use the user play histories to provide one or more of the following features:

Play History Recommendations

When a customer visits the merchant web site 58, an option is presented to view a list of products that are recommended based on some or all of the works previously played by that customer (e.g., those played in the last month). This list of recommended products may be generated using the methods described in the Section III below, but using play history items as the "items of known interest." In one embodiment, play history items and/or play history recommendations may be displayed on a special web page from which the user can individually deselect or rate items in order to more accurately guide future recommendations. The play history recommendations may also be communicated to users by e-mail or by any other communications method.

Playlist Recommendations

When a player allows users to create and store "playlists" of works that can be selected for playing, these playlists can also be transmitted by the recommendation plug-in 34 (or other type of player component) to the recommendations application 42 as "items of known interest" upon which recommendations can be based. Such playlists may also be treated as a unit, or "session," for purposes of similarity analysis and recommendation generation.

Display of Most Popular Products/Artists

Users may be presented with the option to browse lists of the most "popular" titles and artists within various works categories, such as, for musical works, Pop, Jazz, and Classical. These lists may be generated for the entire user population and/or for specific communities, as disclosed in U.S. application Ser. No. 09/377,447 referenced above. The popularity levels of the titles may be determined from the play histories of the user population, by monitoring the "velocity" of each title (the rate at which the title moves up a "most frequently played" list) or the "acceleration" of each title (the rate at which the velocity of playing events of the title is increasing over time). Information about "popular" works may also be combined with other aspects of the recommendations services. In addition, works that are characterizing of, or uniquely popular with, a particular community may be identified by comparing each work's popularity level within the community to its popularity within a general user population.

Display of Play Histories

Customers may also be given the option to selectively expose their play histories to other users. For instance, a customer may be given the option to grant permission to other users individually, or to groups or communities of users, to view the customer's play history or current playing activity (e.g., "What's Andy H. Listening To Right Now?") on the merchant web site 58. This may be accomplished using methods similar to those used for sharing purchase histories, as described in U.S. application Ser. No. 09/715,929, filed Nov. 17, 2000, the disclosure of which is hereby incorporated by reference.

Display of Data on Product Detail Pages

Product detail pages associated with specific products sold by the merchant may be supplemented with one or more types of data mined from the play histories. This information may include, for example, the number of users who are currently playing ("1025 people are listening to Dave Matthews Band's 'Everyday' right now") or who have played the title in the last day, or a "play ranking" indicating how frequently the music title is played relative to others in the same category. Further, the detail pages may be personalized for the particular viewer by indicating that the music title was recently played by an associated user (e.g., "Bob Smith played a track from this CD during the last week").

Creation of a Play List Based on Personalized Recommendations

Personalized recommendations may be communicated to a player that is configured to play the recommended works, with or without direct input from the user. Such works may already be stored in the player device, may be available for download from a content server or file-sharing peer, or may be part of a repository of works to which the player has access. Section VI describes this use of personalized recommendations in greater detail.

As will be recognized by the foregoing, the various features of the above-described music implementation, including the use of metadata tags and other identifying information, are also applicable to other types of digital works, including but not limited to video products (e.g., DVDs), multi-media products, still photography and graphics, written word products, and others. In addition, the implementation may be extended to monitor playing events on other types of networked playing devices. As described above, devices can include both (a) dedicated devices such as portable MP3 players, Compact Disk (CD) players, Digital Video Disk (DVD) players, and handheld electronic book devices; and (b) general-purpose computing devices such as PCs and Personal Digital Assistants (PDAs) configured to play or output digital works to users.

III. Examples of Methods for Generating Recommendations

The process of generating personalized recommendations based on works played, downloaded, purchased, otherwise consumed or stored on user devices, or any combination of the foregoing will now be described, using an embodiment that operates in conjunction with a player of musical works as an example. The example embodiment will be described as generating one or more real-time recommendations based on a work that is currently being played. Other variations will be described throughout the section. This description and the variations described at the end of the section are intended to illustrate, and not to limit, the scope of the invention.

Figure 3:
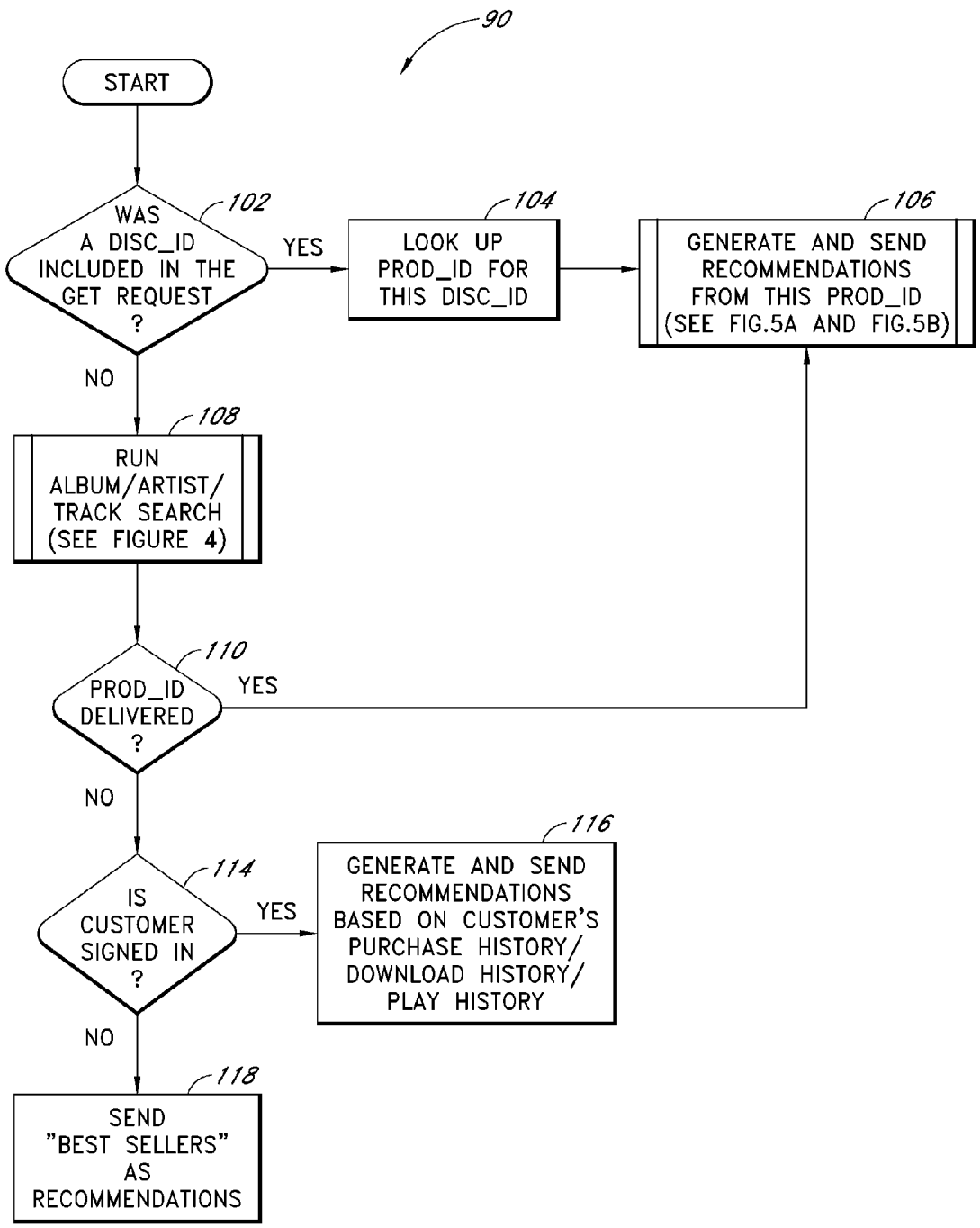
FIG. 3 depicts a sequence of steps for identifying a product ID that correlates with incoming metadata and using it to generate personalized recommendations.

The process of generating personalized recommendations is based on the identification of one or more products as being of "known interest" to the user and on the identification of other products that are similar to the products of "known interest." This process is carried out by the recommendations application 42, and can be viewed, very generally, as comprising three stages. The first stage involves "translating" the metadata about the currently playing work into a product ID or other identifier that corresponds to the items available for recommendation from the web site system 58. The second stage involves using the identified product ID to locate other items assumed to be similar to the work associated with the product ID. These similar products are thus good candidates for being of current interest to the user and for being used as recommendations. The third stage of the recommendation process involves transmitting the recommendations to the user device 30. FIG. 3 represents one embodiment of a process 90 to generate recommendations that encompasses these three stages.

Referring to FIG. 3, the process 90 begins at step 102 by determining if a DiscID was included in the GET request received from the recommendations plug-in 34 of the user device 30. If a DiscID was included, the process 90 can move to step 104, where it looks up the product ID that corresponds to the received DiscID and, in step 106, uses the identified product ID to generate personalized recommendations for sending back to the user device 30, as will be described in greater detail with reference to FIGS. 5A and 5B.

If, in step 102, no DiscID was received, the process proceeds to step 108 where it attempts to identify a product ID that corresponds to the received metadata by running one or more searches on the contents of the products database 64, as will be described in greater detail with reference to FIG. 4.

Moving from step 108 to step 110, the process 90 determines if the search was successful in identifying a product ID to use in generating personal recommendations. If a product ID was identified, the process 90 moves to step 106 where it uses the identified product ID to generate personalized recommendations for sending back to the user device 30, as will be described in greater detail with reference to FIGS. 5A and 5B.

If the process 90 is not successful in identifying a product ID that corresponds to the current metadata, the process can attempt to find another source of recommendations for sending to the user device 30. The process 90 moves to step 114 where it determines if it can identify the current user (for example, by means of a session cookie, login ID, or other identifying information). If no user identification is possible, the process 90 can move to step 118, where it can use non-personalized information about current "best-sellers" or other currently popular works, or works that the web merchant currently chooses to promote, and the process 90 can send these to the user device 30 as non-personalized recommendations.

Returning to step 114, if the process 90 is able to identify the user, the process can move to step 116 where it accesses information stored in the user profiles database 64 (for example, previous play history, purchase history, download history, or other user information), if any exists, for use in generating personalized recommendations.

The recommendations associated with the currently playing work are sent to the user device 30, and the user plug-in 34 continues to monitor and to report on the works played on the user device 30.

Figure 4:
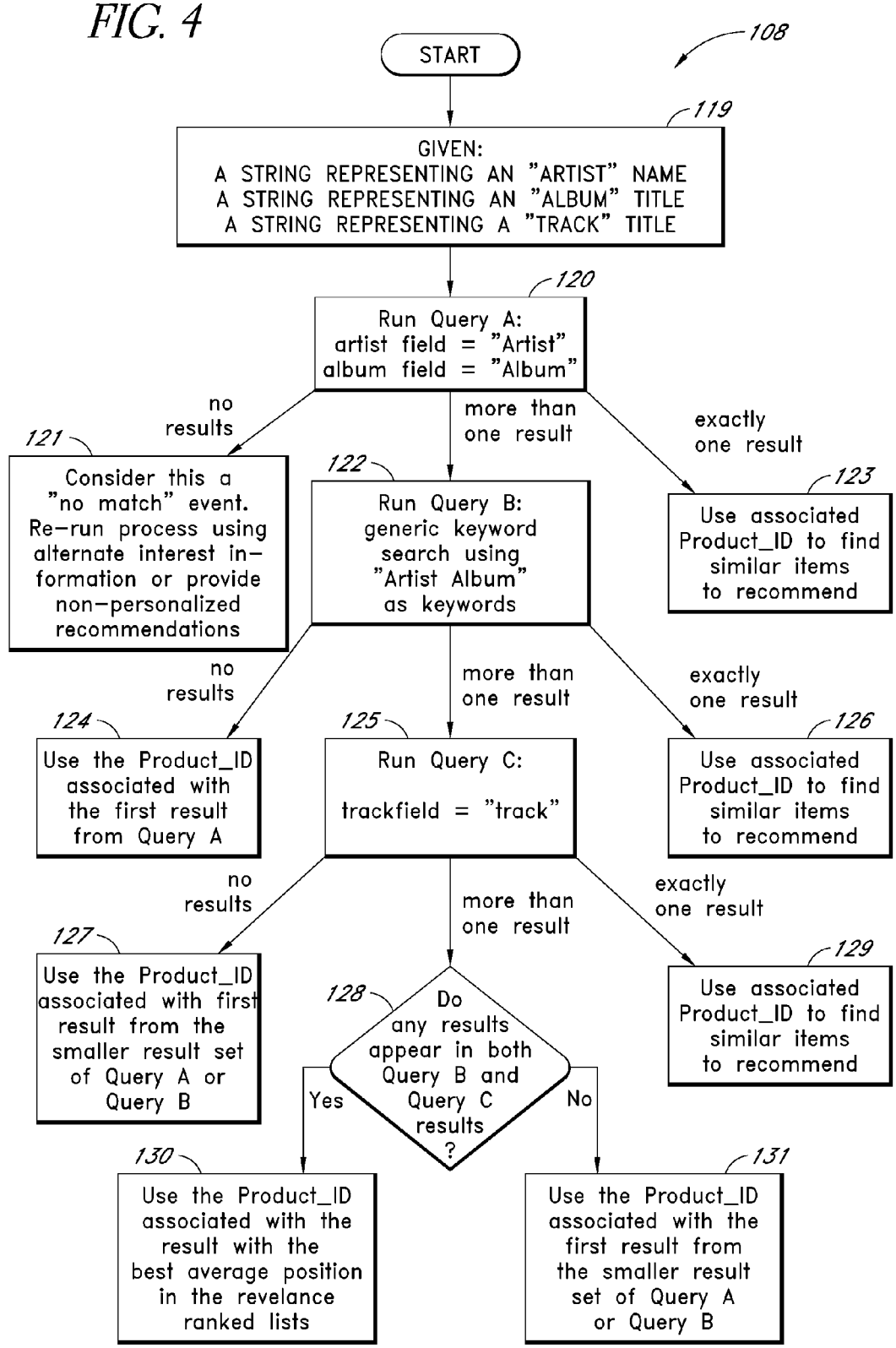
FIG. 4 illustrates one embodiment of a sequence of steps for translating metadata into a product ID that correlates to a given work.

FIG. 4 describes in greater depth one embodiment of the search mentioned with respect to step 108 of FIG. 3 for situations in which no DiscID can be identified in the metadata sent from the user device 30 to the recommendations application 42. When the recommendations application 42 is not able to extract a DiscID from the metadata, the task of finding an associated product ID can be complicated by the fact that the format of the metadata is not universally standardized and is not protected from modification by users. FIG. 4 presents one embodiment of a process 90 to translate incoming Album/Artist/Track metadata into a product ID that is deemed to best correlate to the currently playing work.

With reference to FIG. 4, the process 108 begins in step 119 by receiving some metadata, for example, a string assumed to represent an "Artist" name, a string assumed to represent an "Album" title, and a string assumed to represent a "Track" title. The process 108 works by running one or more search queries (steps 120, 122, and 125) on the products database 64 in an attempt to identify a single product ID that best represents the work currently playing on the user device 30. After each query 120, 122, 125, the results returned can be classified according to whether they contain exactly one result (as in steps 123, 126 and 129), whether they contain more than one result (as in steps 122, 125, and 128), or whether they contain no results at all (as in steps 121, 124, and 127).

When one result is returned to a search query (steps 123, 126, 129), the result can be assumed with some confidence to correspond to the work "of current interest," and the product ID of the single result can be used to generate personalized recommendations. Process 108 is therefore complete, and control can pass on to step 110 of FIG. 3.

Step 120 describes a first query, nicknamed Query A for purposes of this description, that searches for a product record in the database 64 with an artist field and an album (title) field whose values match those received in the metadata from the user device 30. If more than one result is returned for Query A, then control passes to step 122 where a generic keyword search, Query B, is run using the "Artist Album" information from the metadata as keywords in an attempt to narrow down the results to a single product that can be used by the FIG. 3 process to generate personalized recommendations. To do so, Query B can be run on the results of Query A. Alternately, Query B can be run on the entire database, and then the intersection of the result sets from Query A and Query B can be taken to be the result set of Query B.

If Query B returns more than one result, a third query, Query C, is run in step 125, in which a search is made for a product record with a "track" field that corresponds to the "Track" information of the metadata.

If the results from Query C in step 125 yield more than one result, the process 108 moves to step 128, where it determines if any product records appear as results of both Query B 122 and Query C 125. If the answer to step 128 is no, the process 108 moves to step 131 and returns the first product ID from the smaller of the result sets of Query A 120 and Query B 122.

If the answer to step 128 is yes, the process 108 moves to step 130 and attempts to find the most appropriate product ID to represent the work of current interest. In implementations where query results are returned in a ranked order according to presumed relevance to the query, the process 108 can take advantage of this by returning the product ID associated with the result that has the best average position or score in the relevance ranked lists.

Returning to step 120, if no result is returned for Query A, the process moves to step 121, where the process 108 terminates without being able to deliver a product ID for use in generating personalized recommendations, and control moves on to step 110 of FIG. 3. If no result is returned for Query B in step 122, the process 108 moves to step 124 where the first product ID from the result set of Query A is returned to the FIG. 3 process 90 for use in generating personalized recommendations. If no result is returned from Query C in step 125, the process 108 moves to step 127 and returns the first product ID from the smaller of the result sets from Query A 120 and Query B 122.

In other embodiments, in addition to using works currently being played as works of "known interest," the recommendations application 42 may use works played more than once, or played during the current session, works that the user is prompted to select as being of interest from a list of popular works, or any of a number of different methods to identify works that may exemplify a current user interest.

Once a product ID is identified that is assumed to represent a work of current interest and relevance to the user, the recommendations application 42 locates similar works to present as personalized recommendations for the user. To do so, the recommendations application 42 refers to the similar products mapping table 72, described earlier with respect to FIG. 2. The similar products mapping table 72 preferably comprises, for each product in the database 64, or for a selected subset of the products, a list of product IDs of other products from the database 64 that have been predicted or determined to be similar to the selected product. In some embodiments, each similar product listed is accompanied by a similarity score, or commonality index, that expresses the relative degree of similarity with the selected product. An example process of generating the similar items table 72 will be described in greater detail in Section IV below.

In one simple embodiment, once a product ID has been identified as correlating to a work of interest to the user, the similar products mapping table 72 can be consulted, and the set of similar products listed in the table 72 can be used directly to create a list of personalized recommendations for the user. In other embodiments, this list of similar products can be filtered, expanded, aggregated, and/or otherwise modified in ways that will be described in greater detail below and that will be familiar to one of ordinary skill in the art. In some embodiments, it may be desirable to incorporate explicit information about user interests (such as explicit ratings of works or listings of exemplary "liked" works) together with the implicit information gathered from the works played.

Figure 5A:
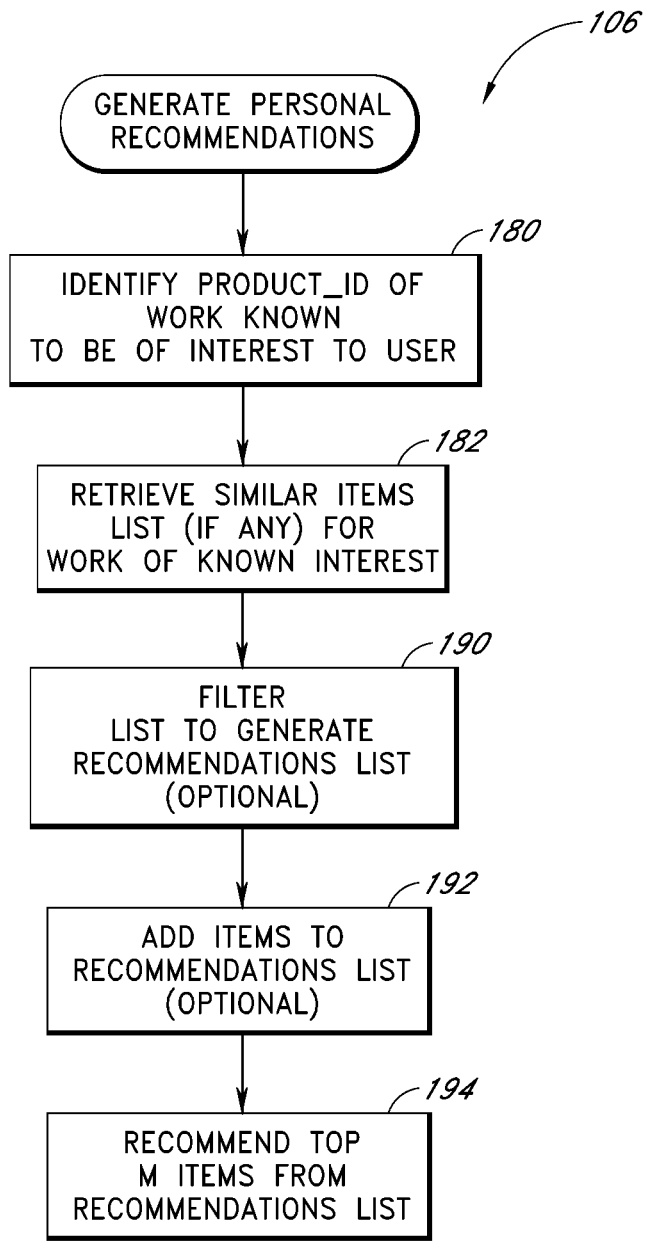
FIG. 5A depicts one embodiment of a sequence of steps that can be performed to generate personalized recommendations from a single product ID.

FIG. 5A depicts one embodiment of a sequence of steps 106 that can be performed by the recommendations application 42 to generate personalized recommendations in response to the GET request from the recommendations plug-in 34, as mentioned in step 106 of FIG. 3. As depicted in FIG. 5A, the recommendations-generation process 106 begins at step 180 by identifying a product ID for a work that is currently playing or currently downloading on the user device 30 and that is therefore assumed to be of "known interest" to the user (as was described with reference to FIG. 4 above). In various embodiments, the "knowledge" of the user's interest can also be based on explicit indications of interest (e.g., the user rated the work highly) or on other implicit indications of interest (e.g., the user included the work on a playlist or played the work frequently during the last month).

In step 182, the recommendations application 42 retrieves the corresponding list of similar items from the similar products mapping table 72, if such a list exists. If no entries exist in the table 72 for the work of known interest, the process 106 may be terminated; alternatively, the process 106 could attempt to identify additional items of interest, such as by accessing other sources of interest information.

From step 182, the process 106 moves on to step 190, where the list may optionally be filtered to remove unwanted items. The items removed during the filtering process may include, for example, works that have already been purchased, played, or downloaded by the user, works that have already been recently recommended to the user, and items that fall outside a desired product group (such as music or videos), product category (such as jazz), or content rating (such as PG or adult) designated by the user. At a merchant web site wishing to encourage the recommendation of currently popular products, the list of similar products provided by the similar products mapping table 72 may be filtered to delete any non-popular products, or may be re-sorted to recommend the more popular products first, thereby giving them the more prominent positions. The list of similar products provided by the similar products mapping table 72 may also be re-sorted to promote less popular artists or other media in the list. Promoting less popular artists or other media may help expose artists and media that may otherwise be overlooked by a large user population even though the artists and media are popular within a smaller subset of the user population. The filtering/sorting step could alternatively be performed at a different stage of the process 106, such as during the retrieval of the similar items lists from the similar products mapping table 72 or upon the player's receiving a list of recommended items from the server. The result of step 190 is a list ("recommendations list") of other works to be recommended to the user.

In step 192, one or more additional works are optionally added to the recommendations list. In one embodiment, works that have been identified as being popular are added to the recommendations list in order to take further advantage of their current popularity. In one embodiment, the works added in step 192 are selected from the set of works (if any) in the user's "recent shopping cart contents" list. As an important benefit of this step, the recommendations include one or more works that the user previously considered purchasing but did not purchase. The works added in step 192 may additionally or alternatively be selected using another recommendations method, such as a content-based method.

Finally, in step 194, a list of the top M works of the recommendations list is identified as being the current complete list of recommendations. The Web server 60 incorporates the works on this list into one or more Web pages that are returned to the user 30. In one embodiment, the list of recommendations is cached, and periodically (e.g., every 15 seconds) at least one recommendation from the list is embedded in a Web page and sent to the mini-browser 56 on the user device 30 for display to the user. When the recommendations plug-in 34 notifies the server 60 that a new work is being played by sending a new HTTP GET request with new metadata, the process of generating personalized recommendations begins again.

Any of a variety of other methods can be used to initiate the recommendations generation process and to display or otherwise convey the recommendations to the user. For example, the recommendations can automatically be generated periodically and sent to the user by email, in which case the email listing may contain hyperlinks to product information pages for the recommended items. The recommendations may alternatively be conveyed to the user by facsimile or other transmission method. Further, the recommendations can be presented as advertisements for the recommended items.

In one embodiment, all or part of the list of recommendations is sent to the recommendations plug-in 34 in the user device 30, where it is cached before being displayed to the user. In one embodiment, only one recommendation is sent to the user for each new work monitored. Further, the personal recommendations could be generated in advance of any request or action by the user, and cached by the Web site 30 until requested.

In embodiments where it is desirable to provide a large number of recommendations, the recommendations application 42 may seek to expand the size or the diversity of the recommendations list beyond the similar products listed for the currently identified work "of known interest." In some embodiments, for example, recommendations are based not only on a currently playing or a currently downloading work, but may also be based on one or more of the following: other works played during the current session; works played, purchased, or downloaded recently by the user; works listed in a user-generated playlist; and other works that may be interpreted as signifying a user's interest. Lists of products that are similar to these works can be identified using the similar products table 72 and can be aggregated to create an expanded set of recommended products. In one embodiment, after an original set of similar products is identified and added to a set of potential recommendations, the recommendations application 42 continues to search the similar products mapping table 72, now using these similar products as base products, and finding additional products that are similar to each of the original set of similar products to add to the recommendations list.

In embodiments that locate more than one list of similar products, the recommendations application 42 aggregates the similar products lists provided by the similar products mapping table 72. Aggregation of the similar products lists can be implemented in a variety of ways, and may include some, all, or none of the following: ordering the similar products according to the similarity ratings assigned to them in the similar products mapping table 72, giving precedence to products that appear on more than one of the identified lists of similar products, filtering out from the set of recommended products any products previously downloaded or purchased or played by the user, filtering out products that have been already recommended to the user (or giving prominence to such products), filtering out products currently out of stock at the merchant web site 58 or known to have a relatively low profit margin when purchased. These and other methods to modify and/or aggregate the results delivered by the similar products mapping table 72 can be implemented without departing from the spirit of the invention. Other methods of using information from a plurality of similar products lists may also be used without departing from the spirit of the invention described herein.

Figure 5B:
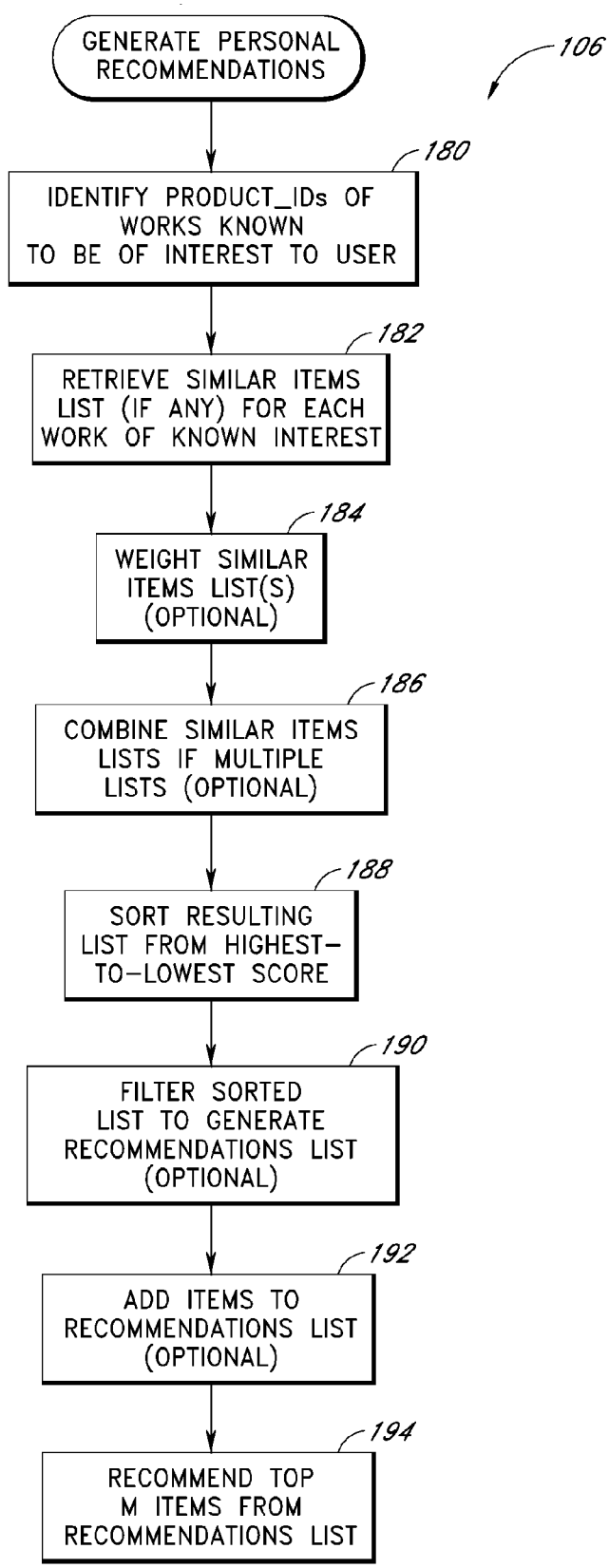
FIG. 5B depicts one embodiment of a sequence of steps that can be performed to generate personalized recommendations from a plurality of product IDs.

FIG. 5B depicts a modified version of the process 106 that was described with reference to FIG. 5A. In the modified version of process 106 to generate personal recommendations, the final set of recommendations is based, at least in part, on a plurality of similar-items lists from the similar products mapping table 72. To accommodate this modification, three additional steps 184, 186, and 188 have been added to the process 106.

With reference to the process 106 as described in FIG. 5B, step 180 may involve identifying more than one work "of known interest," and step 182 comprises retrieving a similar items list, if one exists, for each work of known interest identified in step 180.

In step 184, the similar items lists retrieved from the similar products mapping table 72 are optionally weighted based on information about the user's affinity for the corresponding works of known interest. For example, a similar items list may be weighted heavily if the user gave the corresponding work a rating of "5" on a scale or 1-5, or if the user purchased multiple copies of the work, or if the user has played the work several times within the current session. Weighting a similar items list 64 heavily has the effect of increasing the likelihood that the works in that list will be included in the recommendations that are ultimately presented to the user. In one embodiment, the user is presumed to have a greater affinity for recently played or downloaded works over earlier played or downloaded works, and, in accordance, works recently downloaded or played recently may be weighted more heavily than works that were downloaded or played earlier.

The lists are appropriately combined in step 186, preferably by merging the lists while summing or otherwise combining the scores of like items. The resulting list can then optionally be sorted in step 188 in order of highest-to-lowest score. By combining scores of like items, the process takes into consideration whether an item is similar to more than one of the works of known interest. For example, an item that is related to two or more of the works of known interest will generally be ranked more highly than (and thus will be recommended over) an item that is related to only one of the works of known interest. In another embodiment, the similar items lists are combined by taking their intersection, so that only those items that are similar to all of the items of known interest are retained for potential recommendation to the user.

Once the multiple lists have been merged in steps 184, 186, and 188, process 106 continues with steps 190, 192, and 194 as was described with reference to FIG. 5A.

IV. Examples of Methods to Determine Relatedness

As described with respect to FIG. 1, metadata received from the player device 30 may be used in the server 40 to build user-specific play histories 44 (or download histories, or other user-specific histories of interests). The play histories 44 may in turn be collectively analyzed by one or more off-line analysis components 46 to identify works (or creators) that are similar, or related, to one another. In one embodiment, relatedness is measured by the frequency with which specific works (or creators) co-occur within the play histories of users. For example, works (or creators) A and B may be treated as highly similar if a significant portion of those who played A also played B, as reflected in the play histories 44. Relatedness data generated by the off-line analysis components 46 may be stored in an item relatedness repository 50 and may be used by the recommendations engine 42 to generate recommendations of works that are similar to a currently identified work "of known interest."

In various embodiments, a measure of relatedness is calculated to generate a similarity score, also known as a commonality index, for pairs of items, as described in greater detail with respect to FIG. 6 below. The resulting item relatedness data may be stored in an item relatedness repository 50 and may be used by the recommendations engine 42 to identify works or creators that are similar to those played by the user. For example, when a user plays work A, the server 40 may automatically recommend the N works that have most frequently been played by users who played A.

The off-line analysis components 46 preferably re-calculate the item relatedness data 50 periodically (e.g., once a week) to generate one or more similar items tables 72 that reflect the most recent playing or downloading activities of users. The recommendation engine 42 preferably uses the most recently generated version of the table 72 to generate recommendations.

Figure 6:
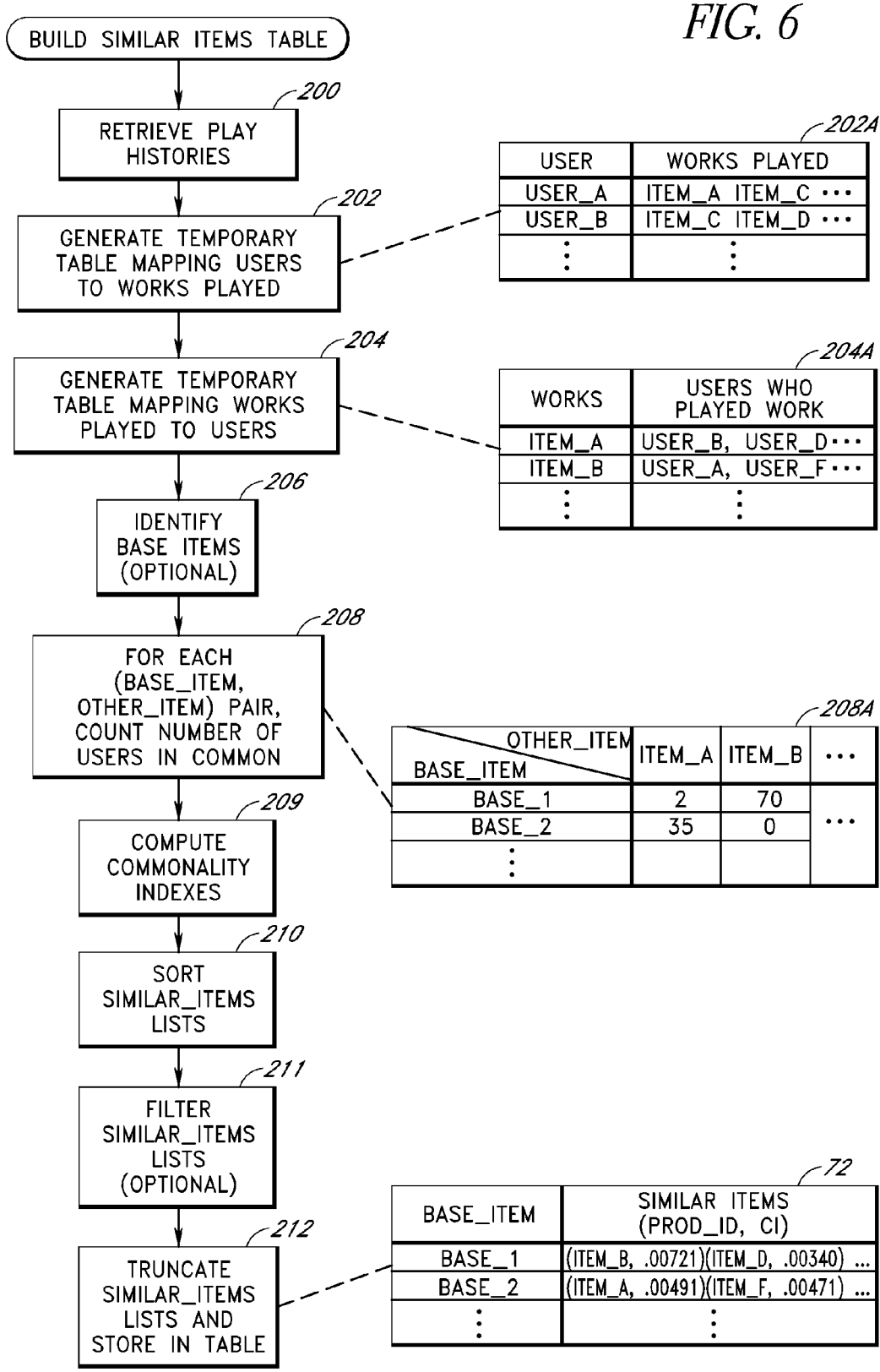
FIG. 6 depicts one embodiment of a set of steps and data structures used in building a similar items table from user histories.

FIG. 6 illustrates one embodiment of a sequence of steps to build the similar items table 72 using play history data. The general form of temporary data structures that are generated during the process are shown at the right of the drawing. As will be appreciated by those skilled in the art, any of a variety of alternative methods could be used to generate the tables 72.

As depicted by FIG. 6, in step 200, the process initially retrieves the play histories for all users or for a subset of the users. In one embodiment, each play history is in the general form of the user ID of a customer together with a list of the product IDs of the items (CDs, videos, etc.) played by that customer. To generate a similar items table 72 that strongly reflects the current tastes of the community, the play histories retrieved in step 200 can be limited to a specific time period, such as the last six months.

In steps 202 and 204, the process generates two temporary tables 202A and 204A. The first table 202A maps individual users to the works they played. The second table 204A maps works to the users that played such works. In one embodiment, to avoid the effects of "ballot stuffing," multiple play events of the same work played by a single user are represented with a single table entry. For example, even if a single user played one song 1000 times, the user will be treated as having played the song only once. In addition, works that were played an insignificant number (e.g., <15) of times are preferably omitted or deleted from the tables 202A, 204B.

The next goal in the process of building a similar items table 72 is to calculate the frequency with which two specific items co-occur in the play histories. Thus, for each item in the database, a frequency can be calculated for every other item in the database. In some implementations, for example in implementations associated with very large databases of products, it may be preferable to limit the number of such calculations. One manner of limiting calculations is to identify a subset of the items, known for purposes of this description as base items, and to calculate the frequencies for each item with respect to the base items. Thus, similar items will be identified only for the selected base items.

In step 206 of FIG. 6, the process identifies the works that constitute "base" items. In one embodiment, works identified as being "popular" are selected to be base items. This may be accomplished, for example, by selecting those works that were played by more than a threshold number (e.g., 30) of users in the table 204A mapping works to users who played the works.

In step 208, the process counts, for each (base_item, other_item) pair, the number of users that are in common. A pseudocode sequence for performing this step is listed in Table 1. The result of step 208 is a table 208A that indicates, for each (base_item, other_item) pair, the number of users the two have in common. For example, in the hypothetical table 208A of FIG. 6, BASE_1 and ITEM_B have seventy users in common, indicating that seventy users played both works.

TABLE 1 for each base_item
   for each user in users_who_played_work
      for each other_item in works_played
         increment common-user-count(base_item, other_item)

In step 209, the process generates a commonality index for each (base_item, other_item) pair in the table 208A. The commonality index (CI) values are measures of the similarity between two works, with larger CI values indicating greater degrees of similarity. The commonality indexes are preferably generated such that, for a given base_item, the respective commonality indexes of the corresponding other_items take into consideration both (a) the number of users that are common to both works, and (b) the total number of users of the other_item. A preferred method for generating the commonality index values is set forth in equation (1) below, where $N_{common}$ is the number of users who played both A and B, sqrt is a square-root operation, $N_A$ is the number of users who played A, and $N_B$ is the number of users who played B.

$$CI(\text{work}\_A, \text{work}\_B) = N_{common}/\text{sqrt}(N_A \times N_B) \quad \text{Equation (1)}$$

Following step 209 of FIG. 6, each base item has a respective "similar items" list that includes all of the other_items from the table 208A along with their associated CI values. In step 210, each similar items list can be sorted from highest-to-lowest commonality index. In step 211, the similar items lists can optionally be filtered, for example, by deleting all list entries that have fewer than 3 users in common. In table 208A in FIG. 6, in the similar items list for BASE_1, ITEM_A would be deleted since BASE_1 and ITEM_A have only two users in common. Deleting such entries tends to reduce statistically poor correlations between works. In step 212, the similar items list can be truncated to length N to generate the similar items lists, which, in one embodiment, are stored in a B-tree table structure for efficient look-up.

In another embodiment, item relatedness is determined based on the co-occurrence of works within user-generated sets of works. As one example, in implementations for use in conjunction with music players, users are sometimes given an opportunity to create and store playlists of works to be played as a single program. A user with diverse musical tastes might create a variety of playlists, each presumably with some unifying characteristic, such as, for example, artist, music genre, or mood. Similarly, works played together within a given period of time, or session, could be presumed to exemplify some type of user interest. Identifying similarity between works based on the frequency of their co-occurrence in user playlists or sessions allows the recommendations application to take advantage of this more specialized source of information.

Figure 7:
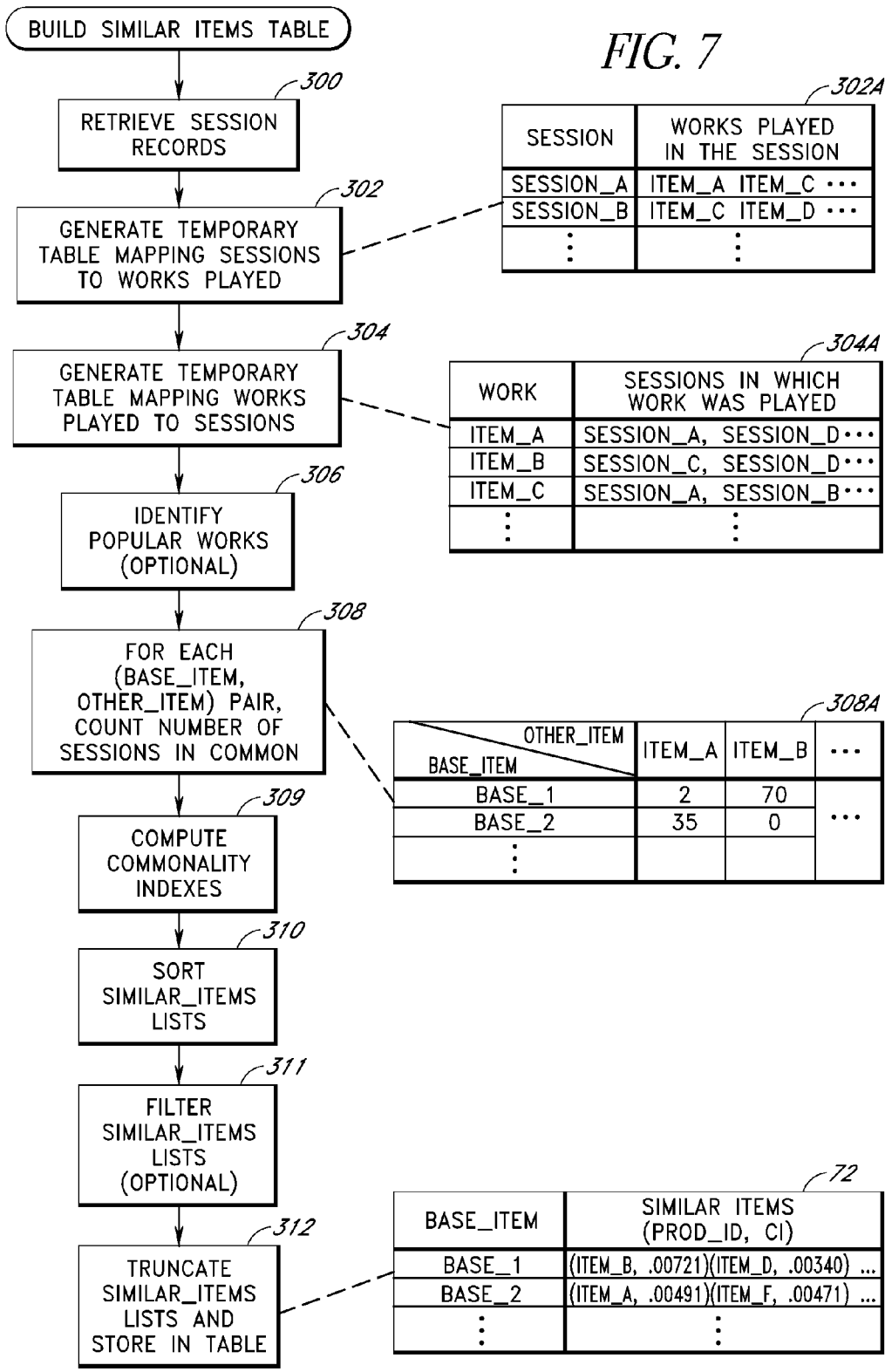
FIG. 7 depicts one embodiment of a set of steps and data structures used in building a similar items table from session histories or playlists.

The process of building a similar items table 72 based on co-occurrence of works in playlists or sessions is very similar to that described with respect to FIG. 6, except that instead of relating works to users, works can be related to the set to which they belong. FIG. 7 uses the term "session" to describe a set of works, such as a playlist, that are presumed to express a user interest and thus to be related.

Referring to FIG. 7, in step 300, the process retrieves records of user sessions. In step 302, the process generates a temporary table 302A that maps sessions to works played during the sessions. Step 304 generates a temporary table 304A that maps works to the sessions in which the works were played. Steps 306-312 complete the process of building a similar items table 72, following a procedure very similar to that described in steps 206-212 of FIG. 6.

V. Use within a Peer-to-Peer File Sharing System

The various features described above may also be implemented within a peer-to-peer file sharing system. Some peer-to-peer file sharing systems, such as Napster, provide a centralized directory of the works currently available for downloading. In one embodiment of such a system, users download a client application that communicates with a central server. The client application reports to the server the metadata associated with MP3 files or other works currently stored on the user's hard drive. The server maintains a directory of the digital works (typically music tracks) that are stored on the computers of users who are currently logged in. Using the client application, a user can search for and select music files and other types of digital works to download directly from the computers of other users.

The above-described recommendation features may be implemented in this type of system as described above, but with the following modifications:

1. The "playlists" or "play histories" can be generated based on what each user downloads from other users, rather than what the user actually plays. These "download histories" can be used to identify related works (e.g., related tracks) using substantially the same methods as described above for played works.

2. In systems with a central server, if the metadata for the downloaded works is already stored in the server's central directory, it may not be necessary to have a player that reports metadata of played tracks or works to the server. For example, when a user selects a track to download, the server can just record the track data in its central directory in association with an ID for the user.

3. To generate recommendations at or following download time, the server can use the same or similar methods to those described above to generate a list of related tracks or other works. The server can then optionally filter this list to remove those tracks or works that are not currently in the central directory, and can display the resulting list to the user as personal recommendations (e.g., "Here are some similar tracks that are currently available," or "Here are some currently available works similar to those you've recently downloaded").

4. The various other information services described above such as the display of the most popular titles and artists, and sharing of play lists with friends, can be implemented as described above, but using the download histories as the play histories.

Other peer-to-peer file sharing systems can be configured to operate without the existence of a centralized directory of works available for download. In some such systems, peer-to-peer sharing of files can occur directly (without the use of a central directory) between a recipient player device that downloads works from a source player device. In such a system, the task of notifying the recommendations server of the works downloaded by a user may be performed either by the source player (in which case the source device would also notify the recommendations server of the recipient's identity) or by the recipient player device.

Figure 8:
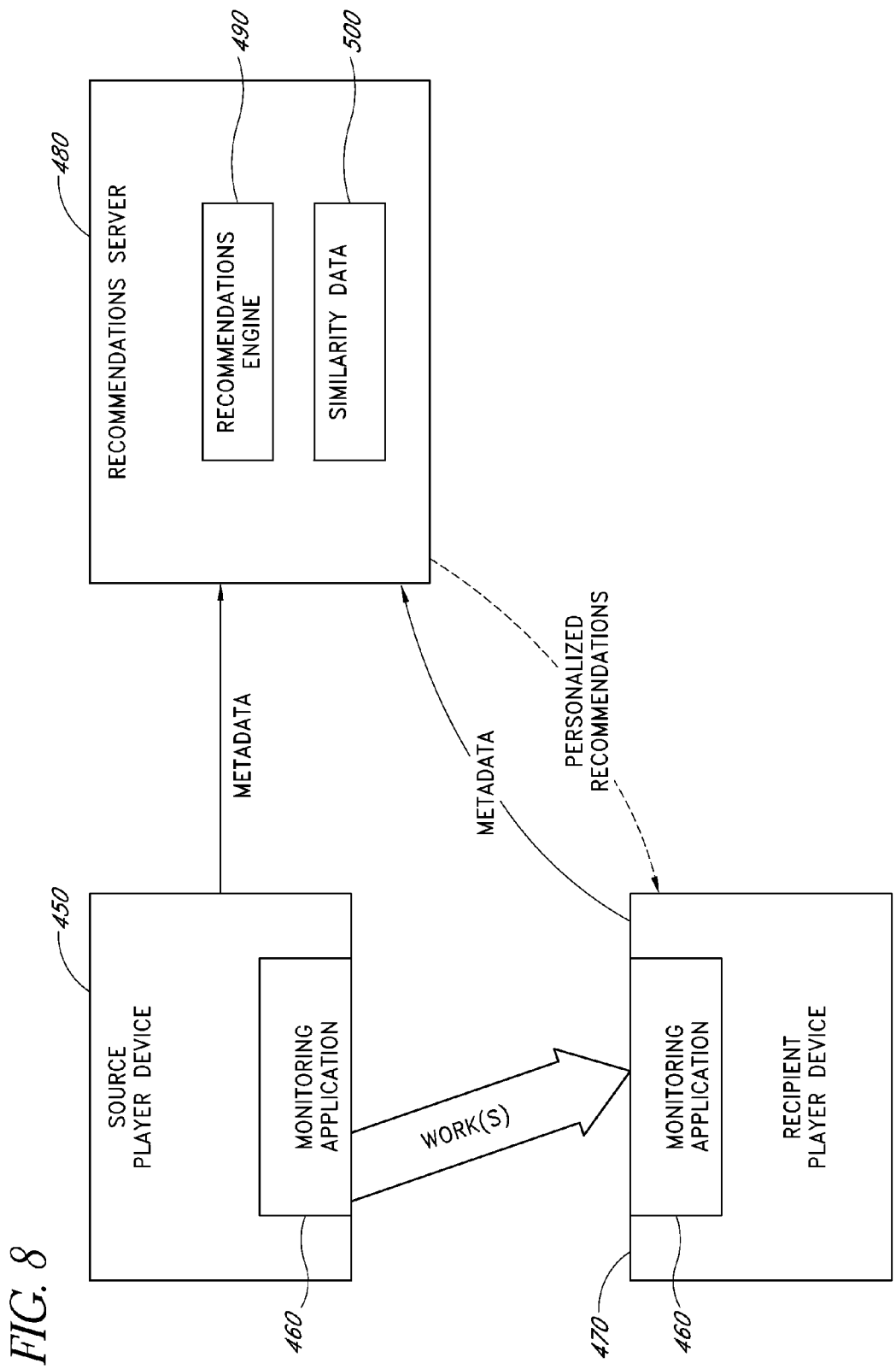
FIG. 8 illustrates an embodiment of the present invention that allows for external monitoring of works.

FIG. 8 depicts one example of a general configuration for an embodiment comprising a source player device 450, a recipient player device 470, and a recommendations server 480 that communicate with one another remotely over a wired or wireless network connection. In the example, the recipient player device 470 is downloading one or more works from the source player device 450. A monitoring application 460 configured on either the source player device 450 or the recipient player device 470 monitors the download(s) and reports metadata about the work(s) being downloaded to the recommendations server 480. The recommendations server 480 accesses a recommendations engine 490 and similarity data 500 as well as user-specific historical data (not shown) in order to generate personalized recommendations for the user of the recipient player device 470, as has been described previously with respect to other embodiments. In one embodiment, some or all of the functionality located on the recommendations server 480 could additionally or alternatively be implemented locally on the recipient player device 470.

VI. Use Within a Self-Contained Content Server

Figure 9:
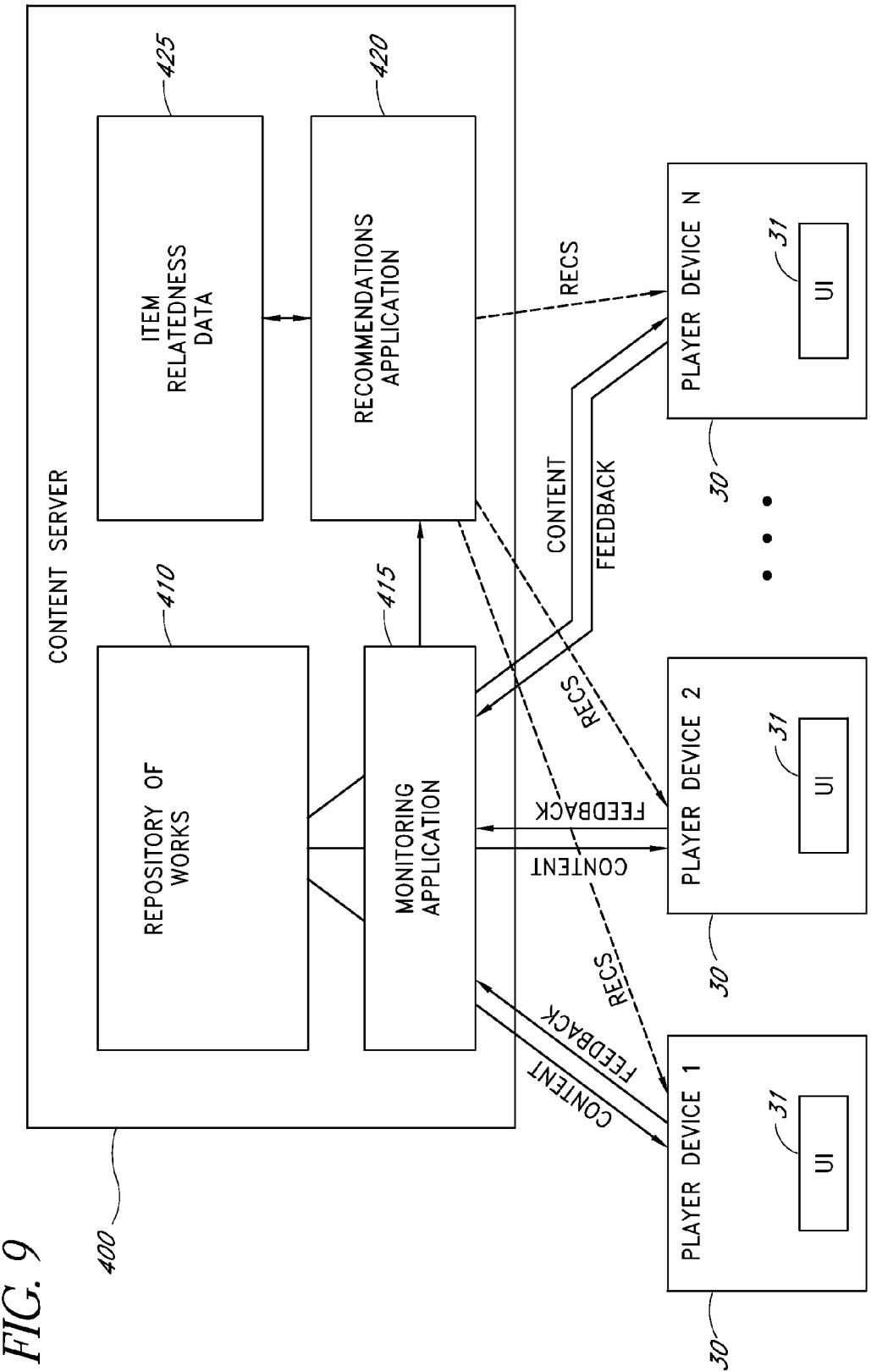
FIG. 9 illustrates a system according to an alternative embodiment of the present invention.

In one embodiment, personalized recommendations of works are provided to player devices associated with distributed audio systems, such as the Linn Knekt system, that comprise large storage modules of digital content. FIG. 9 depicts one example of such a system in which a content server 400 comprises a repository of works 410 that can be transmitted for playing on individual player devices 30. In this embodiment, the content server 400 comprises a monitoring application 415 that extracts, or otherwise obtains, metadata about works transmitted to the player devices 30 for playing and that reports the metadata to a recommendations application 420. The recommendations application 420 accesses item relatedness data 425 to generate personalized recommendations for transmission to the player devices 30. The generation of both item relatedness data and personalized recommendations may be implemented using substantially the same methods using historical user data (not shown) as described with respect to FIGS. 3-7 above or may be modified to take advantage of the "known" identity of works in the repository 410. In the FIG. 9 embodiment, the player devices 30 may comprise a user interface (UI) 31 to display the received recommendations to users and to allow the users to communicate with the content server 400.

FIG. 9 can also depict a pay-per-play repository of downloadable works that transmits personalized recommendations to player devices 30 in conjunction with transmitting one or more work(s) to the player devices 30 for a fee.

FIG. 9 can further depict a Napster-like file sharing system that provides personalized recommendations of works, except that in this embodiment the repository of works 410 component is replaced by a directory of works that are currently available for download from other player devices and except that the digital works are transferred between the users' player devices 30.

Figure 10:
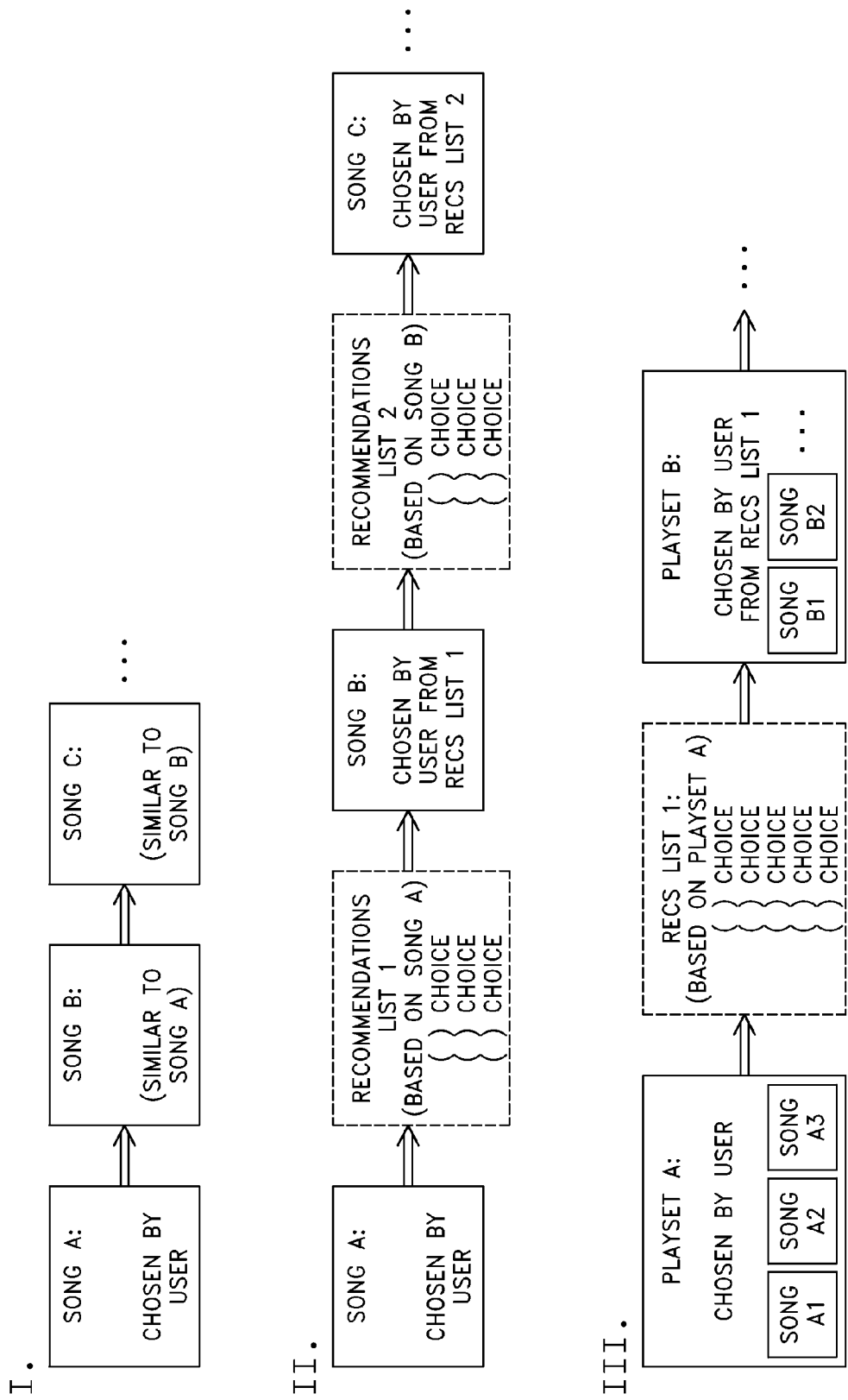
FIG. 10 depicts three embodiments of algorithms to present recommendations and works to users.

In one embodiment, recommendations based on works consumed may be provided as a suggestion to users, as has been described above, or may be used by the content server 400 to automatically generate personalized programs of works for playing on the user devices 30, or both. FIG. 10 depicts three algorithms for using personalized recommendations to play personalized selections of works on player devices 30. The algorithms are described within the context of a player device 30 that plays songs.

In Algorithm I, a first song A is selected for playing by a user. Metadata about the song is sent to the recommendations application 420 for generation of a personalized recommendation, as has been described above. Song B, a recommended work that is similar to song A, is automatically transmitted to the player device 30 for playing. The monitoring application 415 transmits metadata associated with song B to the recommendations application 420, in order to identify a third song, song C, that is recommended based on song B, for playing on the player device 30. In this way, the content server 400 is able to provide a personalized program of works to the player devices based on a single user-selected work, in which each song is used as the input for selecting the next song. In a very similar fashion, the user may select two or more songs as the "seeds" from which an ongoing, automated playlist can be generated.

In Algorithm II, a first song A is selected by a user, as above. Here, rather than automatically playing a next, automatically-selected song, the recommendations application 420 provides a set of recommended works (Recommendations List 1) for selection by the user. Once the user selects a song from Recommendations List 1, the selected song B is transmitted to the player device 30 for playing, and metadata associated with song B is transmitted to the recommendations application 420 to generate a next set of recommended works (Recommendations List 2). In this manner, each user-selected work is played on the player device 30 and is used to generate a next set of recommended works.

In Algorithm III, playing and recommending of works is based on playsets, rather than on individual works. In the embodiment depicted in FIG. 10, a user designates a playset or list of songs for playing, which are transmitted to the player device 30 for playing. Metadata about the play set is also reported by the monitoring application 415 to the recommendations application 420, which generates a list of recommended works (Recs List 1) for display to the user. Works selected from Rec List 1 by the user are transmitted to the player device as playset B for playing and are used by the recommendations application 420 to generate a second list of recommended works.

As will be clear to one with ordinary skill in the art, these and other algorithms may be employed in conjunction with the use of personalized recommendations for playing works on user devices.

Although this invention has been described in terms of certain preferred embodiments and applications, other embodiments, configurations, and applications that are apparent to those of ordinary skill in the art, including embodiments which do not provide all of the features and advantages set forth herein, are also within the scope of this invention. Accordingly, the scope of the present invention is intended to be defined only by reference to the appended claims.

What is claimed is:

1. Non-transitory computer storage that stores executable code that instructs a computer system to perform a process that comprises:
   accessing user-generated playlists of each of a plurality of users, each user-generated playlist specifying a plurality of digital works grouped together for playing;
   generating digital work similarity data that identifies particular digital works that are similar to each other, wherein generating the digital work similarity data comprises generating measures of how frequently particular digital works co-occur on the user generated playlists; and
   storing the digital work similarity data in computer storage for subsequent look-up.

2. The non-transitory computer storage of claim 1, wherein generating the digital work similarity data comprises generating a data value that represents a degree to which a first digital work and a second digital work are similar to each other, said data value dependent upon a number of times the first and second digital works co-occur on the user-generated playlists.

3. The non-transitory computer storage of claim 1, wherein the digital works are music tracks.

4. The non-transitory computer storage of claim 1, wherein the digital work similarity data is based additionally on co-occurrences of the digital works in play histories of users.

5. The non-transitory computer storage of claim 1, wherein the process additionally comprises receiving the user-generated playlists from player devices of the users.

6. The non-transitory computer storage of claim 1, wherein the process additionally comprises generating creator similarity data based at least partly on the user-generated playlists.

7. The non-transitory computer storage of claim 1, wherein the process additionally comprises using the digital work similarity data to cause a player device of a user to display a recommendation of a first digital work that is a similar to a second digital work currently being played on the player device.

8. The non-transitory computer storage of claim 1, wherein the process additionally comprises using the digital work similarity data to cause a player device of a user to automatically play, following the completion of playing of a first digital work selected by the user, a second digital work that is similar to the first digital work.

9. The non-transitory computer storage of claim 1, wherein the process additionally comprises using the digital work similarity data, in combination with information regarding digital work preferences of a user, to generate a recommended playlist for the user, said recommended playlist comprising a personalized selection of digital works.

10. The non-transitory computer storage of claim 1, in combination with the computer system, wherein the computer system is programmed with said executable code to perform said process.

11. Non-transitory computer storage that stores executable code that instructs a computer system to perform a process that comprises:
accessing user-generated playlists of each of a plurality of users, each user-generated playlist specifying a plurality of digital works grouped together for playing;
generating creator similarity data that identifies particular digital work creators that are similar to each other, wherein generating the creator similarity data comprises determining how frequently particular digital work creators co-occur on the user generated playlists; and
storing the creator similarity data in computer storage for subsequent look-up.

12. The non-transitory computer storage of claim 11, wherein generating the creator similarity data comprises generating a data value that represents a degree to which a first creator and a second creator are similar to each other, said data value dependent upon a number of times the first and second creators co-occur on the user-generated playlists.

13. The non-transitory computer storage of claim 11, wherein the digital works are music tracks.

14. The non-transitory computer storage of claim 11, wherein the creator similarity data is based additionally on co-occurrences of the creators in play histories of users.

15. The non-transitory computer storage of claim 11, wherein the process additionally comprises receiving the user-generated playlists from player devices of users.

16. The non-transitory computer storage of claim 11, wherein the process additionally comprises using the creator similarity data to select digital works and/or digital work creators to recommend to users.

17. The non-transitory computer storage of claim 11, in combination with the computer system, wherein the computer system is programmed with said executable code to perform said process.

18. Non-transitory computer storage comprising executable code that directs a player device of a user to perform a process that comprises:
accessing a user-generated playlist stored on the player device, said user-generated playlist specifying a plurality of digital works grouped together by the user for playing;
transmitting the user-generated playlist from the player device to a server;
receiving, from the server, information specifying at least one recommendation of an additional digital work, said recommendation based at least partly on the playlist; and
causing the recommendation of the additional digital work to be displayed on the player device.

19. The non-transitory computer storage of claim 18, wherein the personalized recommendation is based in part on digital work similarity data, said digital work similarity data based at least partly on co-occurrences of digital works on a plurality of user-generated playlists of a plurality of users.

20. The non-transitory computer storage of claim 18, wherein the process further comprises transmitting to said server data regarding digital work playing events on the player device, wherein the at least one recommendation is based additionally on said digital work playing events.

21. The non-transitory computer storage of claim 20, wherein the data regarding playing events includes timestamps indicating when particular digital works were played.

22. The non-transitory computer storage of claim 20, wherein the executable code is configured to cache the data regarding the digital work playing events on the player device when no network connection is available, and to transmit the cached data regarding playing events to the server when a network connection is established.

23. The non-transitory computer storage of claim 18, wherein the digital works are music tracks.

24. The non-transitory computer storage of claim 18, in combination with a computer system programmed to use the playlist, in combination with playlists received from player devices of other users, to identify digital works that are similar to each other.

* * * * *